July 26, 1966  S. T. CARTER  3,262,422
APPARATUS FOR APPLYING GUM TO A LABEL PICKER
Filed May 20, 1963  20 Sheets-Sheet 1

INVENTOR.
SIDNEY T. CARTER
BY
ATT'YS

INVENTOR.
SIDNEY T. CARTER

INVENTOR
SIDNEY T. CARTER
BY
ATTORNEYS

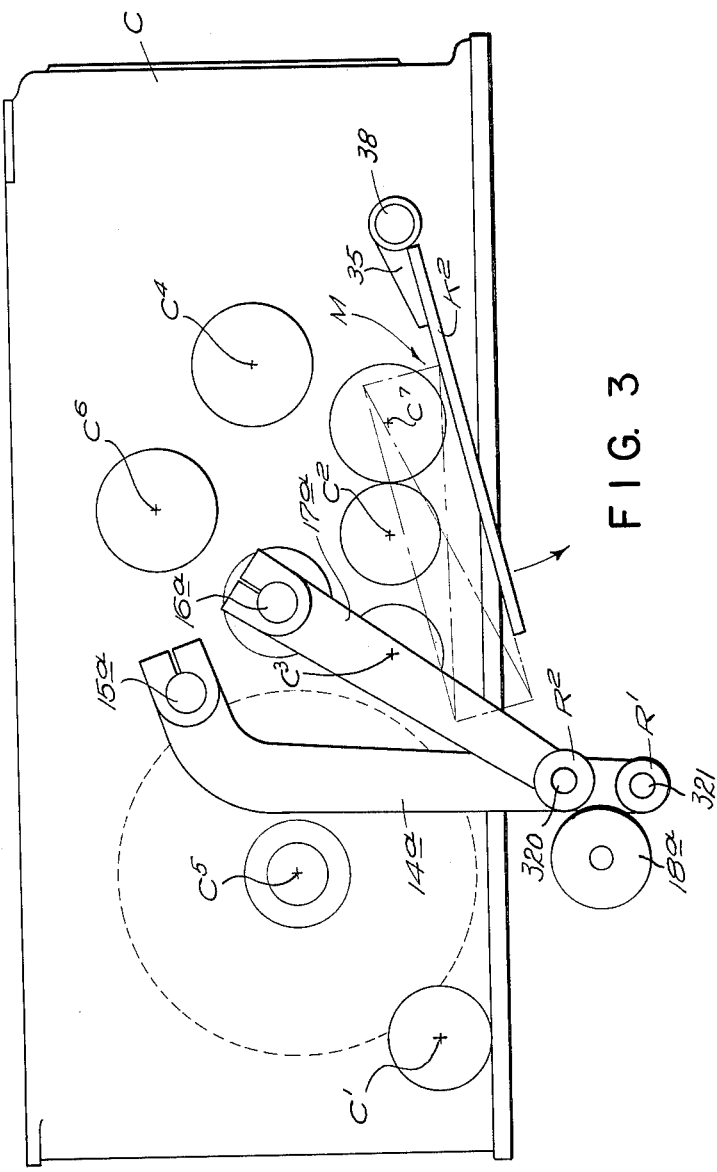

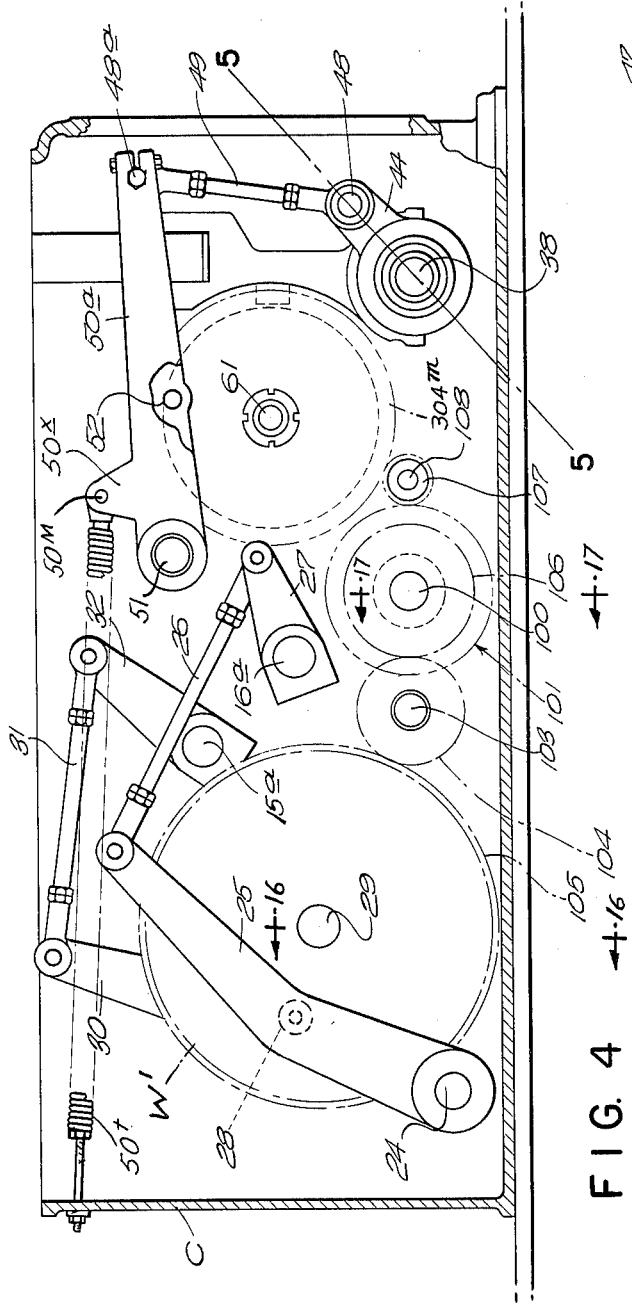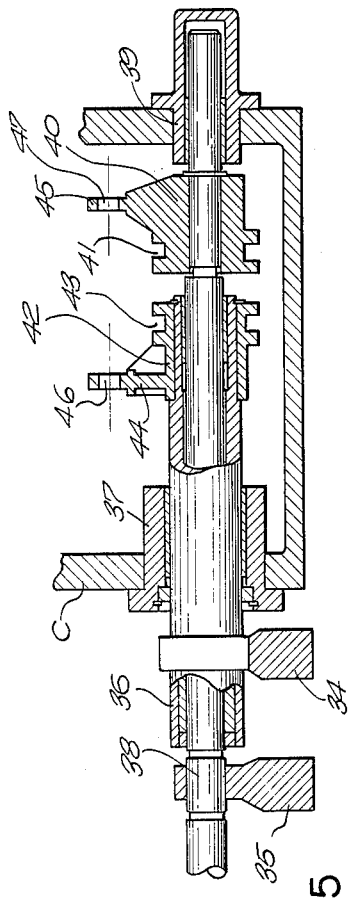

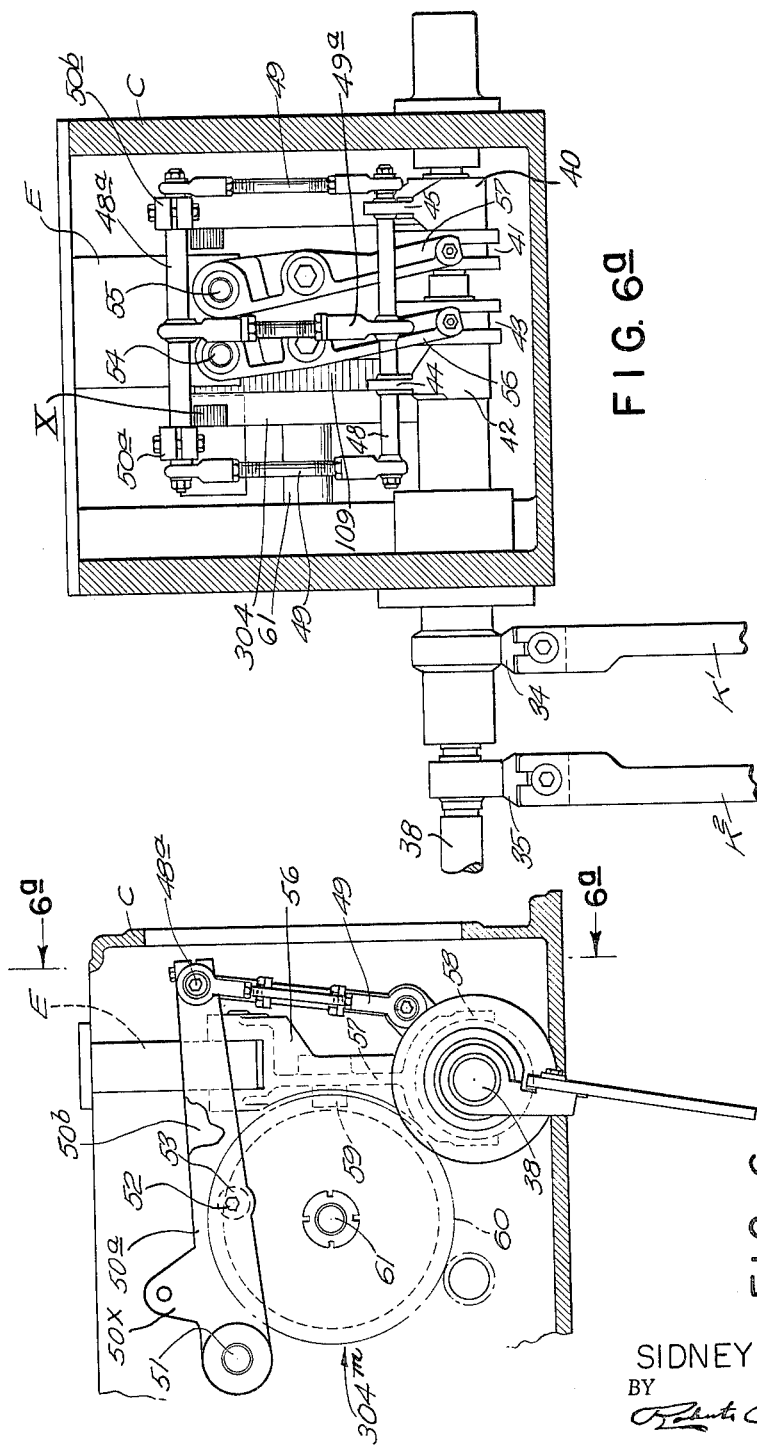

July 26, 1966 S. T. CARTER 3,262,422
APPARATUS FOR APPLYING GUM TO A LABEL PICKER
Filed May 20, 1963 20 Sheets-Sheet 7
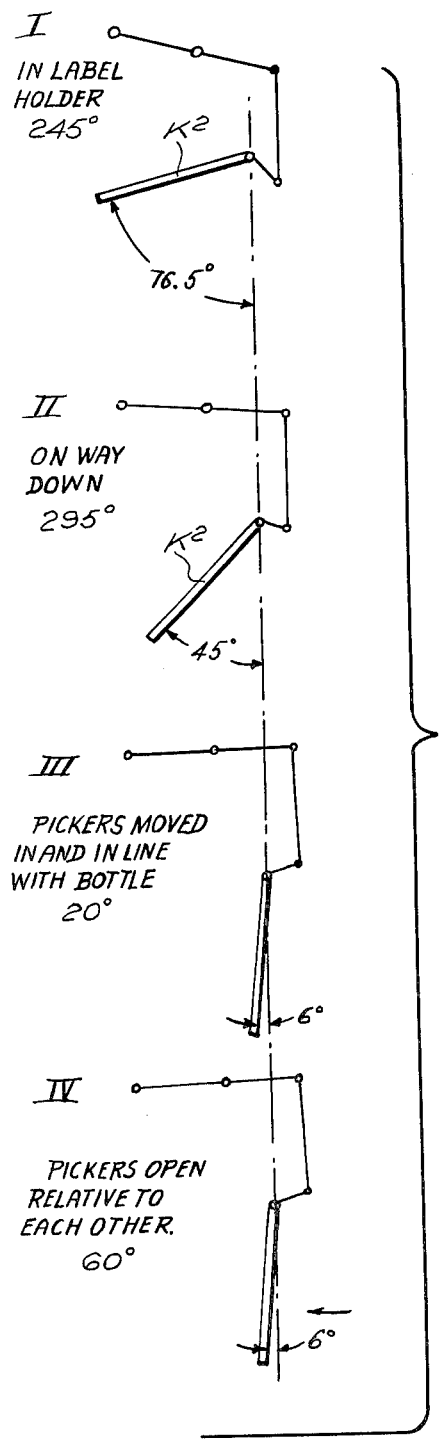
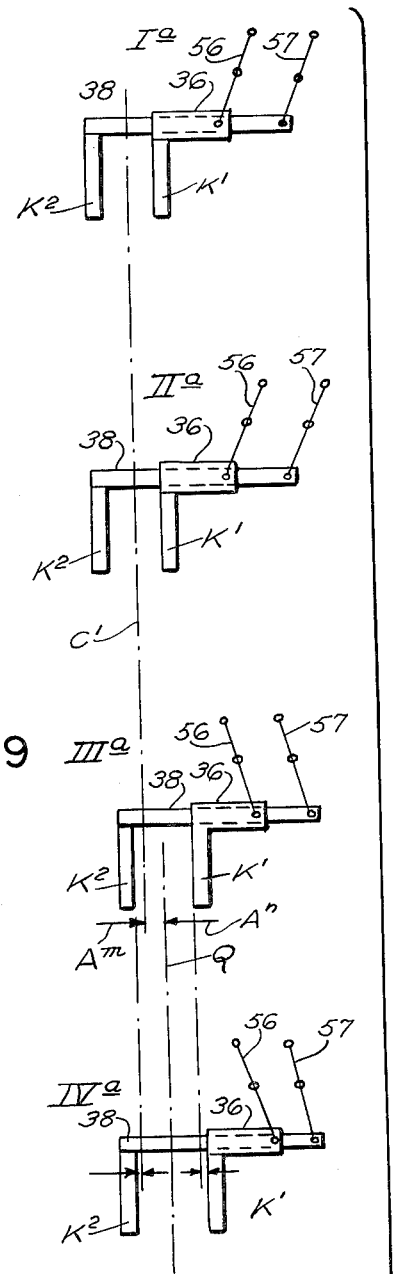
FIG. 9
FIG. 9a
INVENTOR
SIDNEY T. CARTER
BY
ATTORNEYS

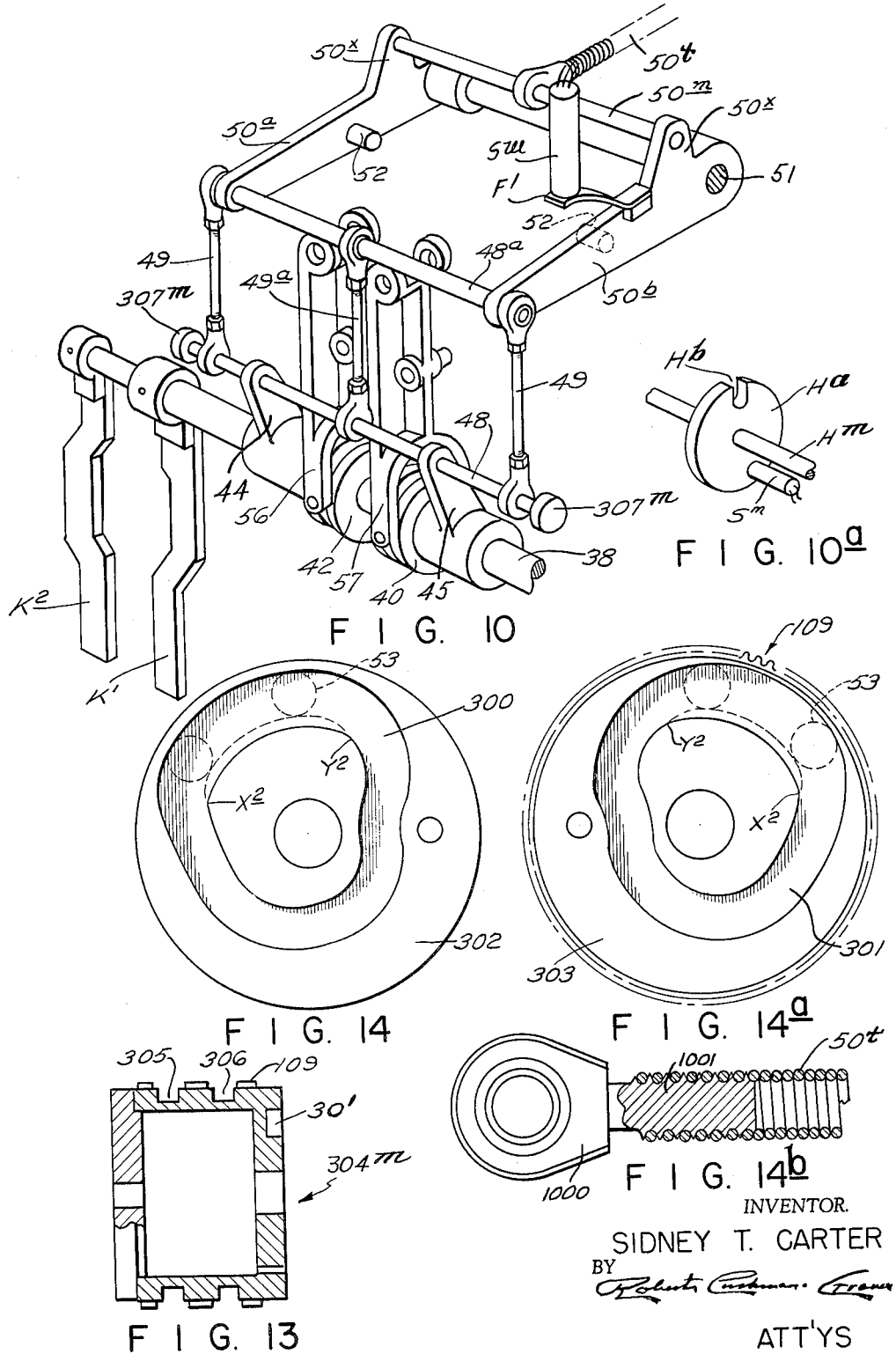

July 26, 1966  S. T. CARTER  3,262,422
APPARATUS FOR APPLYING GUM TO A LABEL PICKER
Filed May 20, 1963  20 Sheets-Sheet 9
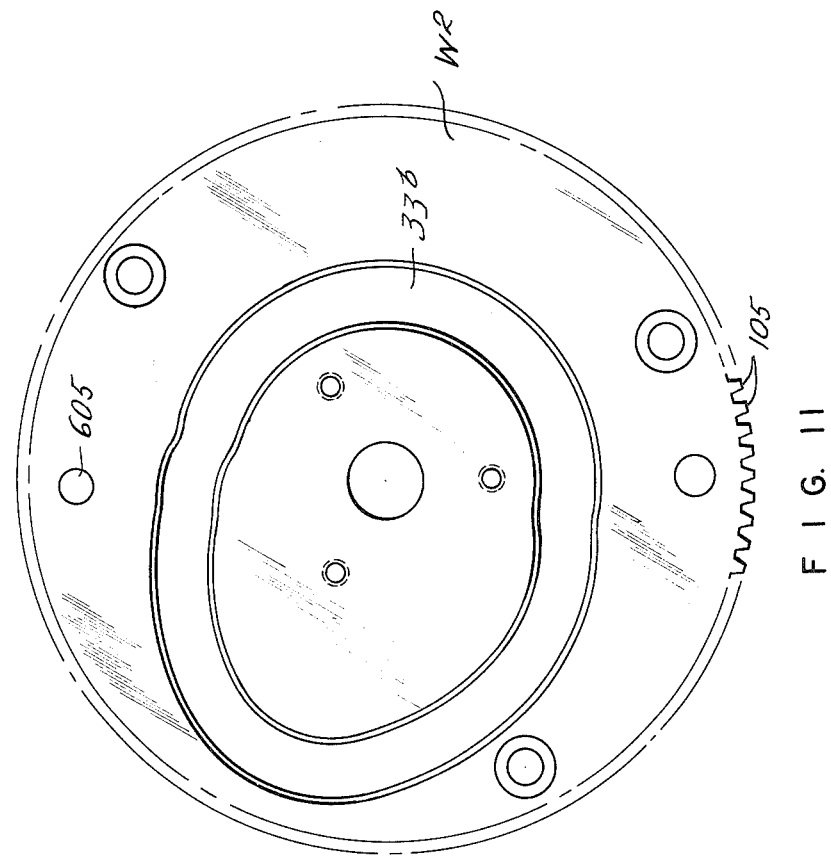
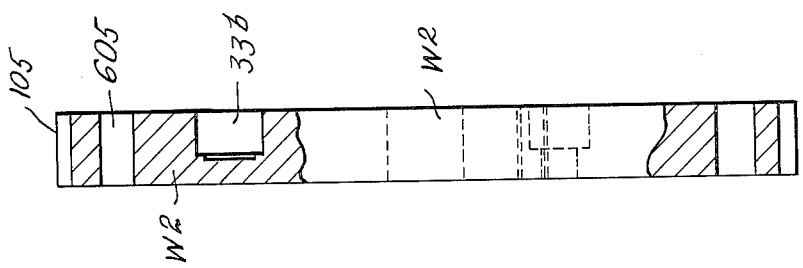
INVENTOR.
SIDNEY T. CARTER
BY
ATT'YS

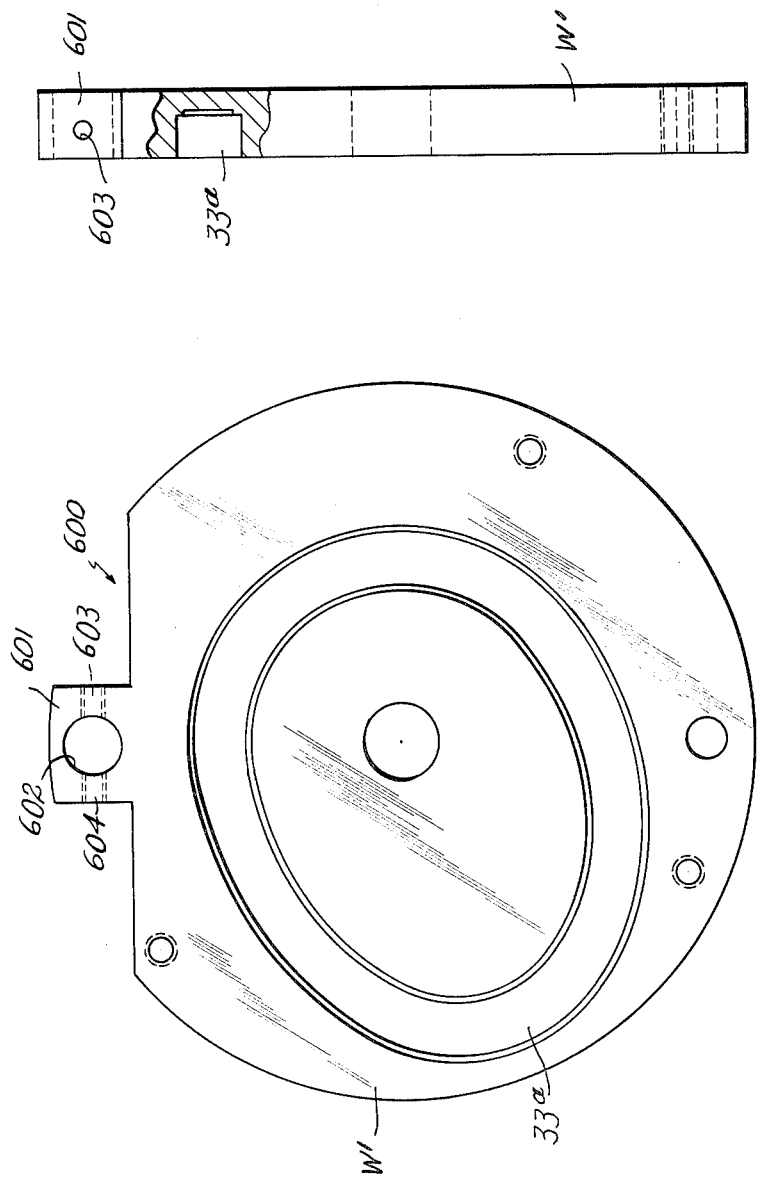

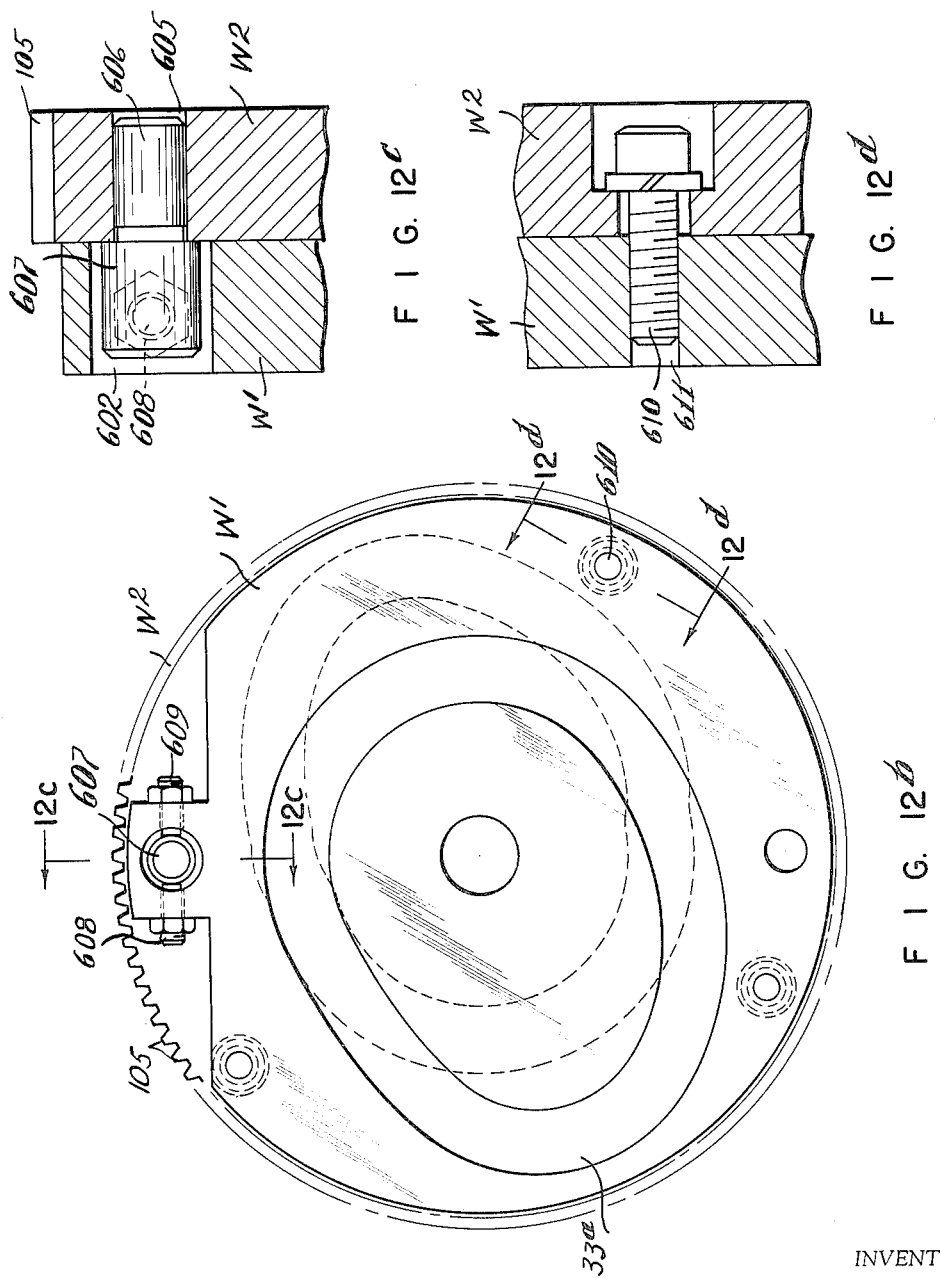

July 26, 1966     S. T. CARTER     3,262,422
APPARATUS FOR APPLYING GUM TO A LABEL PICKER
Filed May 20, 1963     20 Sheets-Sheet 14

INVENTOR.
SIDNEY T. CARTER
BY
ATT'YS

July 26, 1966 S. T. CARTER 3,262,422
APPARATUS FOR APPLYING GUM TO A LABEL PICKER
Filed May 20, 1963 20 Sheets-Sheet 15

INVENTOR.
SIDNEY T. CARTER
BY
ATT'YS.

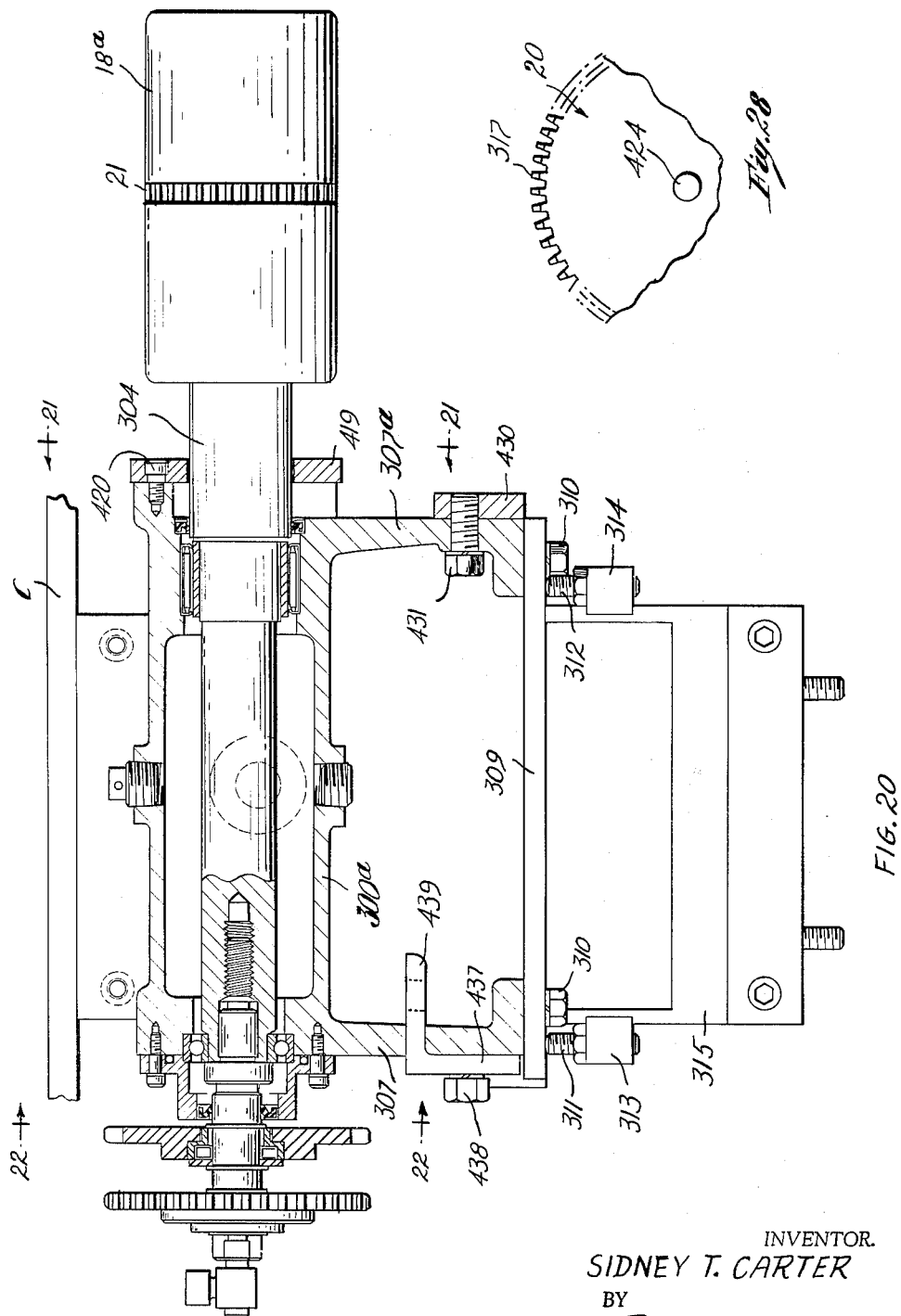

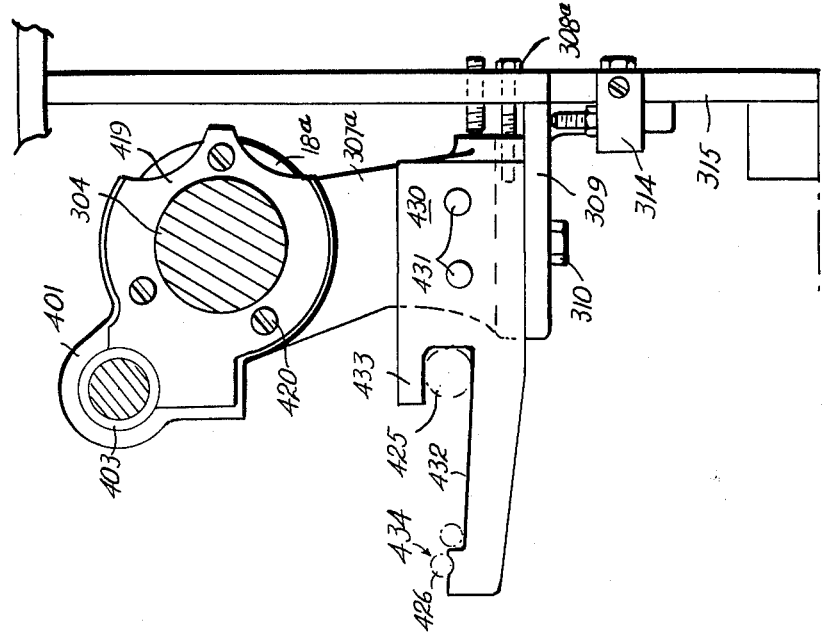
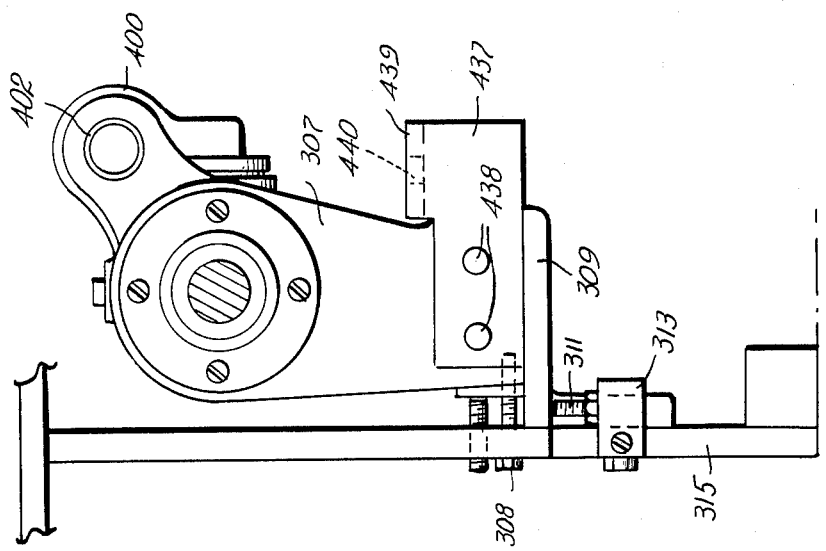

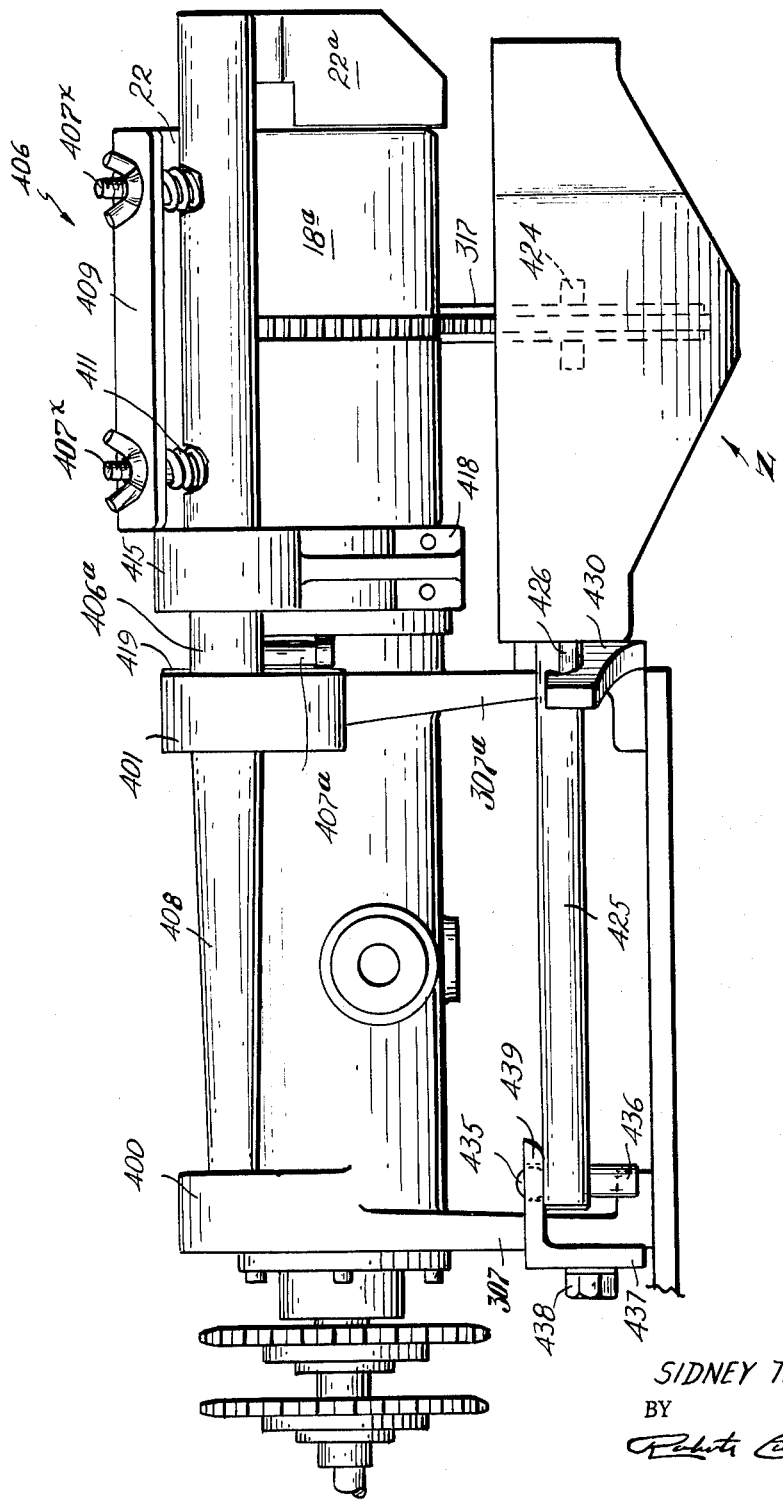

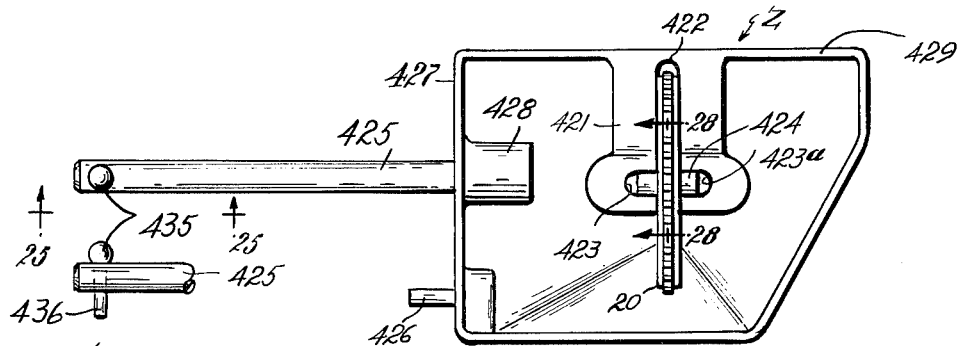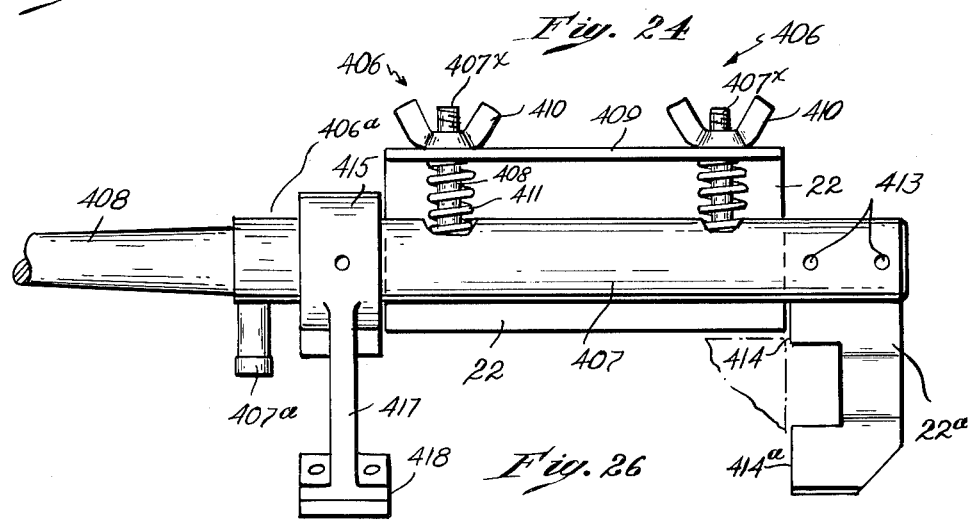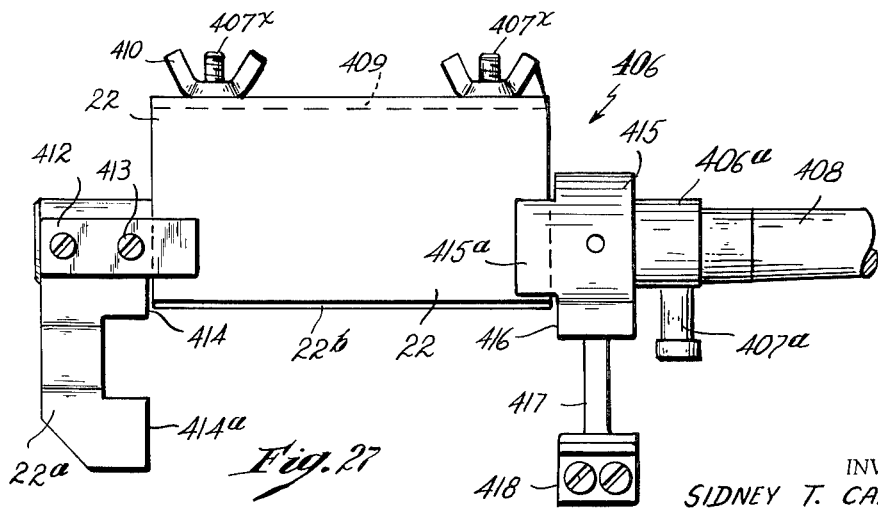

United States Patent Office
3,262,422
Patented July 26, 1966

3,262,422
APPARATUS FOR APPLYING GUM TO A
LABEL PICKER
Sidney T. Carter, Shrewsbury, Mass., assignor to Geo. J.
Meyer Manufacturing Co., Cudahy, Wis., a corporation
of Wisconsin
Filed May 20, 1963, Ser. No. 281,624
25 Claims. (Cl. 118—263)

This invention pertains to label-applying mechanism and more especially to improved means for applying gum to the face of a label picker.

In labeling machines of the kind in which the label is removed from the magazine by an adhesively-coated picker, it is usual to supply the picker with a coating of gum just prior to each label-picking operation. Usually the liquid gum is held in an open-topped gum box. A constantly rotating gum-supply roll receives a coating of gum from this box and from this supply roll gum is taken by a bodily movable transfer roll which is then moved in such a way as to transfer its coating of gum to the face of the picker just before the latter advances into the label-receiving position.

It requires an appreciable period of time for the transfer roll to receive its coating of gum from the supply roll—it being noted that the transfer roll is usually rotated only by contact with the supply roll, and a further period of time for the transfer roll to deliver its coating of gum to the picker and then to return to the supply roll to receive a fresh coating of gum. The users of labeling machines are insistent in their demands for increased production, but one limiting factor in the attainment of higher speeds has been the inability of the gum-applying means to deliver an adequate coating of gum to the pickers when running at unusually high speeds. In the effort to increase the speed of the gumming apparatus, it has been proposed to rotate the gum-supply roll at higher than usual velocity in the hope that by so doing the gum-transfer roll would receive an adequate supply of gum for high-speed operation, but the physical characteristics of the gums employed for this purpose are such that substantial increase in the rotational velocity of the gum-supply roll, above that customarily employed, has been found impractical.

One object of the present invention is to provide an improved gum-applying means for use in a labeling or similar machine, whereby, without increase in the normal rotational velocity of the gum-supply roll, it becomes possible and practical to supply the picker with an adequate coating of gum even when the picker is operated at a much higher rate, in performing its label-picking function, than has heretofore been practical. A further object is to provide gum-applying means for transferring gum from a supply to an oscillatory picker, wherein two gum-transfer rolls are employed and so actuated that these rolls alternately, in successive cycles of the machine, respectively, apply gum to the picker.

A further object is to provide novel and useful means for actuating the picker and gum-transfer means in accurately timed relation. A further object is to provide means, in a machine employing alternately operating gum-transfer rolls, so to time the operation of said rolls as to afford an interval in the cycle of operation of each roll within which both rolls are spaced from the gum-supply roll, thereby making it possible to stop the machine while both transfer rolls are out-of-contact with the gum-supply roll. A further object is to provide a transfer roll and a supply roll with which the transfer roll cooperates, wherein provision is made for so relatively adjusting the rolls as to insure the application of a coating of uniform thickness to the transfer roll. A further object is to provide safety means operative to prevent breakage of parts as the result of a displaced bottle.

By the use of the apparatus herein described, it is possible substantially to double the rate of label application as compared with usual practice without turning the gum-supply roll any faster than the usual speed of the gum-supply roll in a similar machine employing but a single gum-transfer roll.

Other and further objects and advantages of the invention will be pointed out in the following more detailed description and by reference to the accompanying drawings wherein:

FIG. 1 is a fragmentary, perspective view (omitting the label magazine and certain other parts), showing the gum-applying apparatus of the present invention as embodied in a rotary or turret-type labeling machine, the two gum-applying or transfer rolls being shown at a time at which they are both closely adjacent to but spaced from the gum-supply roll, while the picker, having taken a label (not shown) from the magazine, is on its way to the transfer position;

FIG. 2 is a fragmentary front elevation, partly in perspective, of the apparatus shown in FIG. 1, showing the parts at a different point in the cycle—one of the gum-applying or transfer rolls being in contact with the gum-supply roll, while the other roll, having received gum, has moved toward the position at which it will soon be contacted by the picker to apply gum to the latter—the picker now being at the transfer position;

FIG. 3 is a diagrammatic front elevation, omitting many parts, merely to illustrate the relative locations of the picker, the magazine, the gum-supply roll and gum-transfer rolls, and the centers of certain shafts of a commercial embodiment of the invention;

FIG. 4 is a vertical, longitudinal section through the casing or housing for the gears and cams which actuate the gum-transfer rolls and picker—with some parts broken away, and showing the several shafts in end elevation and diagrammatically indicating the locations of some of the cams;

FIG. 5 is a fragmentary section, to larger scale, on the line 5—5 of FIG. 4;

FIG. 6 is a fragmentary, vertical section through the casing which houses the mechanism for actuating the gum-transfer rolls and picker—the picker shaft being shown in end elevation with the picker at the lowest point of its travel;

FIG. 6a is a section through the same casing, showing the means for moving the picker blades laterally, the section being substantially on the lines 6a—6a of FIG. 6;

Figure 7:
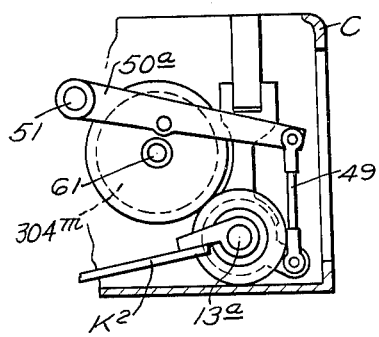
FIGS. 7 and 7a are views similar to FIGS. 6 and 6a, respectively, but showing the picker blades at the highest point in their path of travel, that is to say, in label-picking position, and as having moved forwardly with reference to the center line of a bottle disposed in label-receiving position.
Figure 7A:
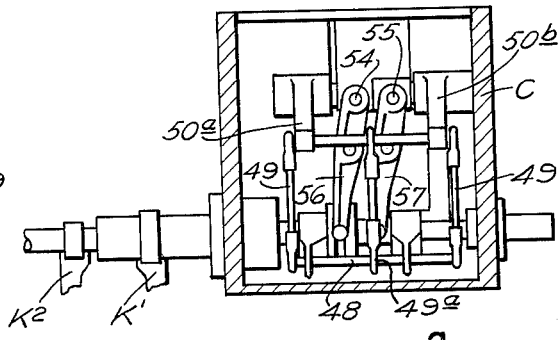
Figure 8:
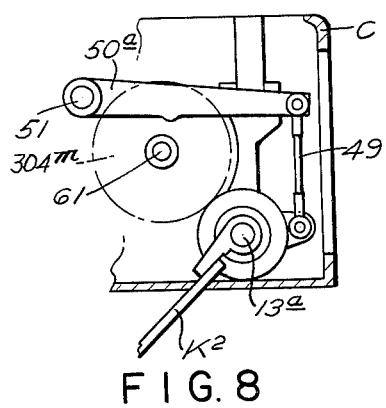
Figure 8A:
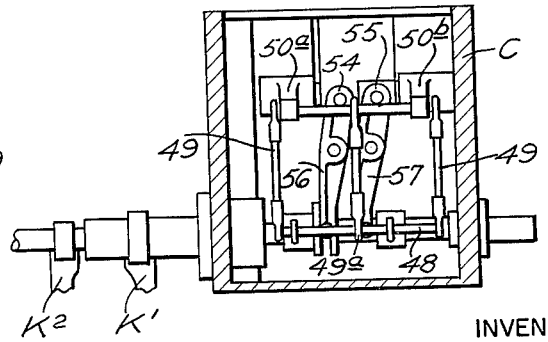
Figure 15:
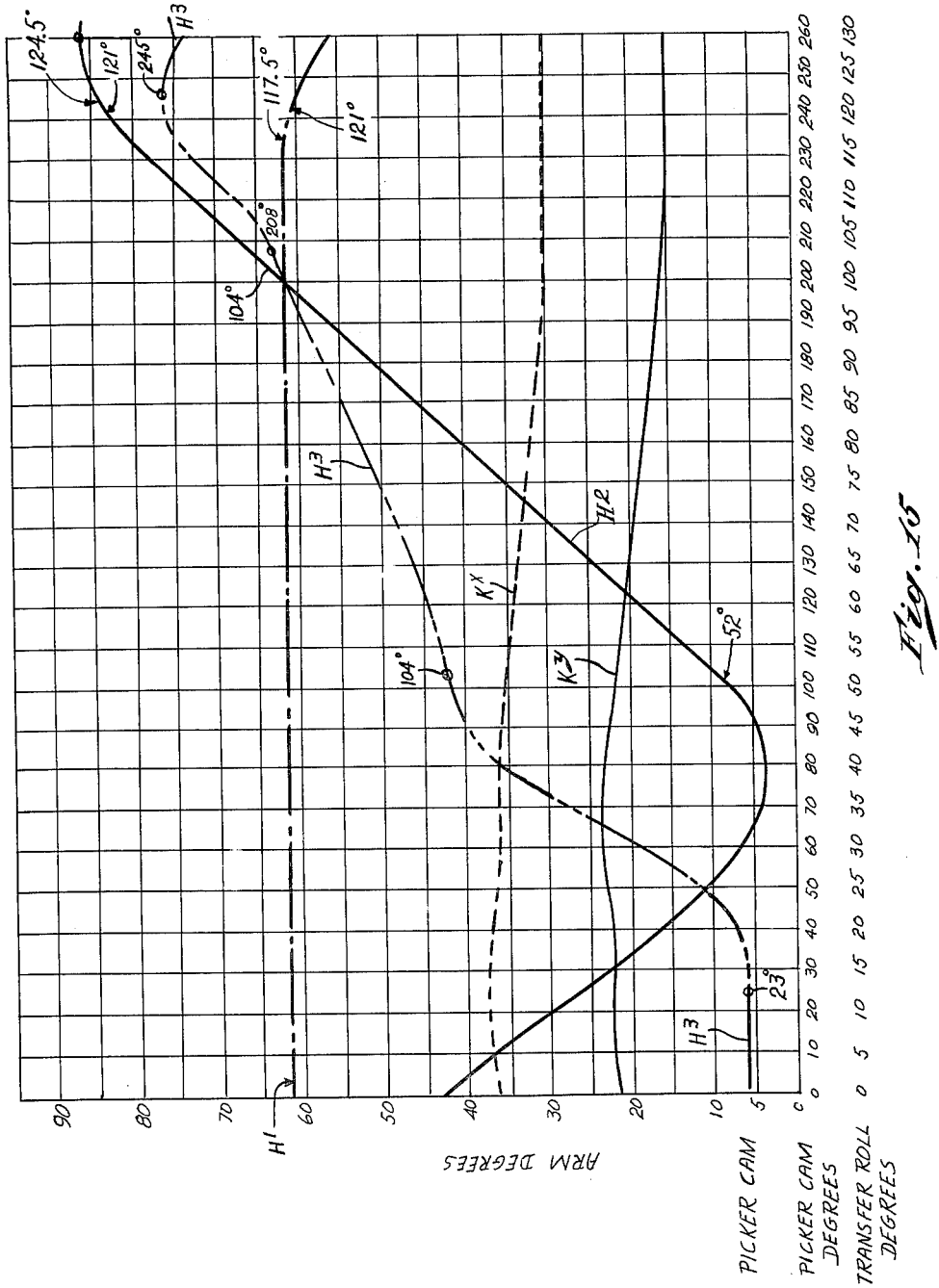
Figure 15A:
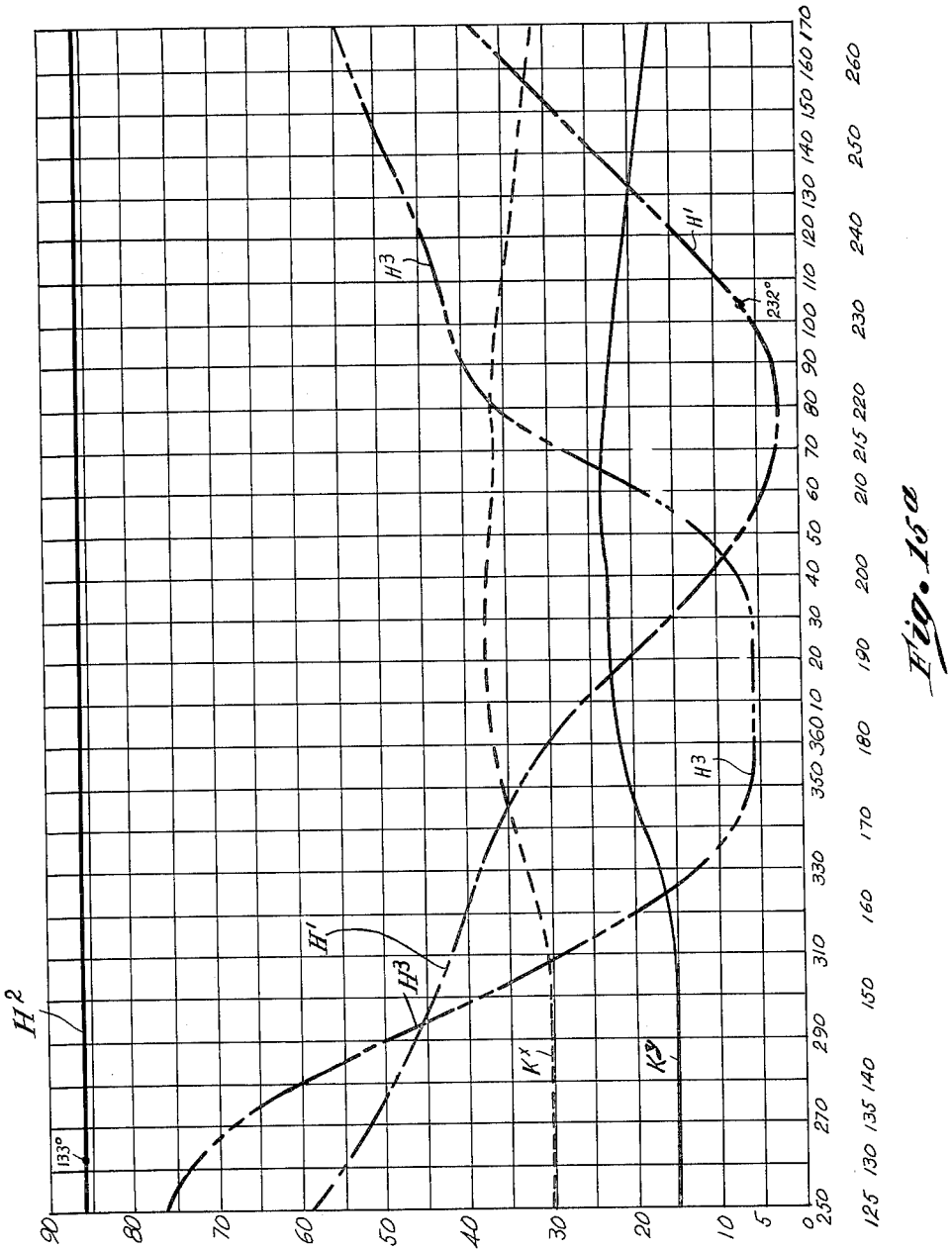
Figure 15B:
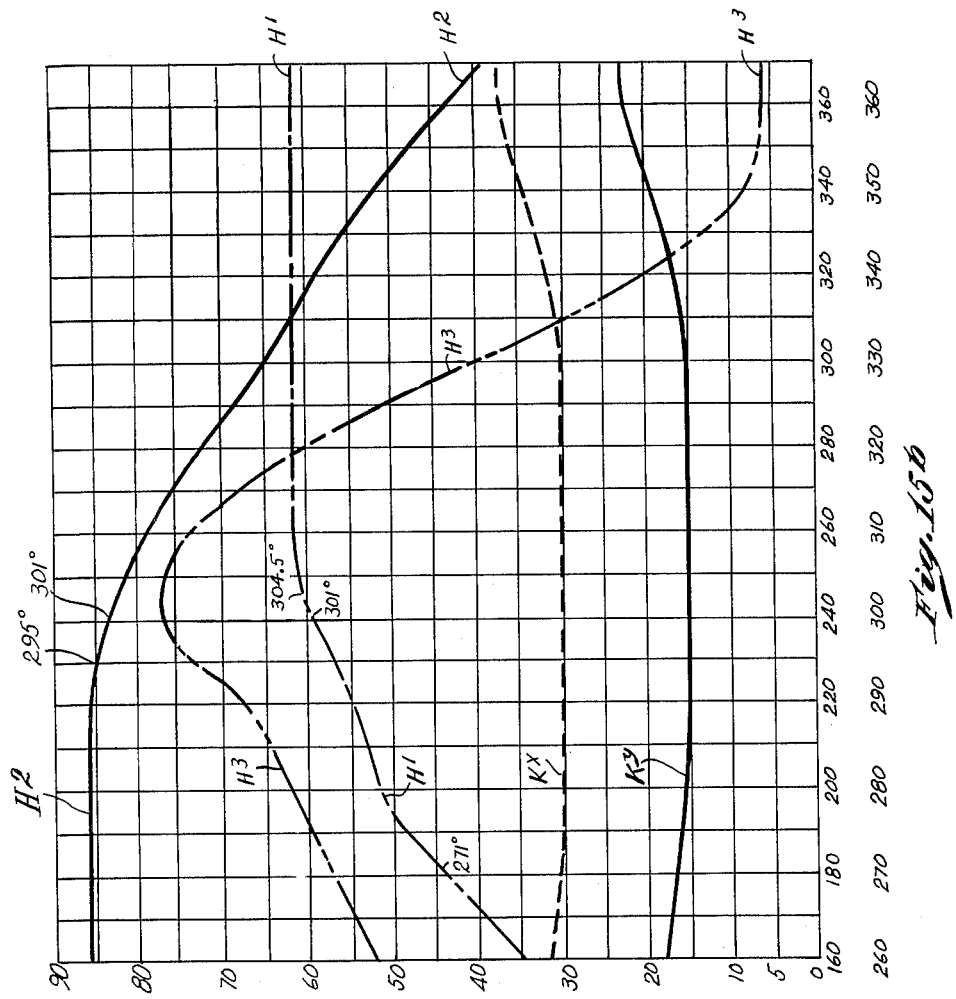
Figure 16:
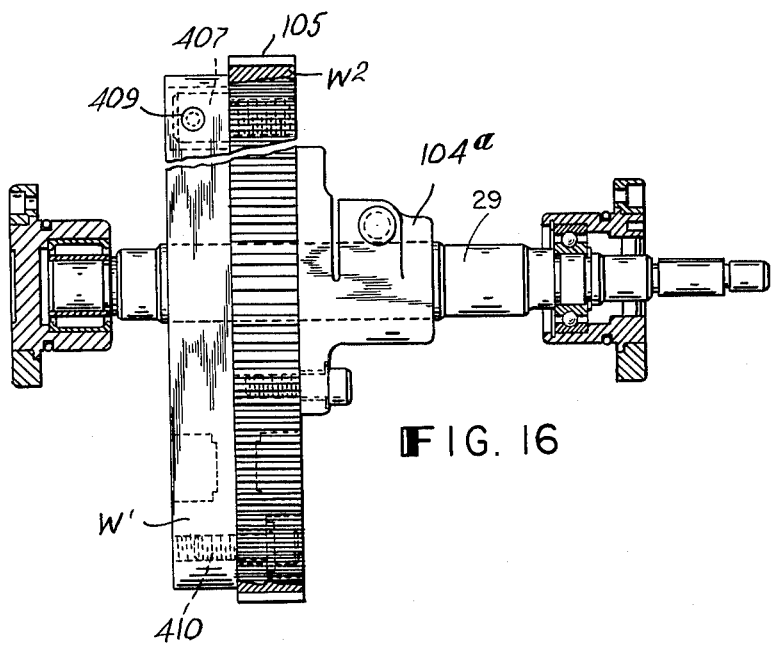
Figure 17:
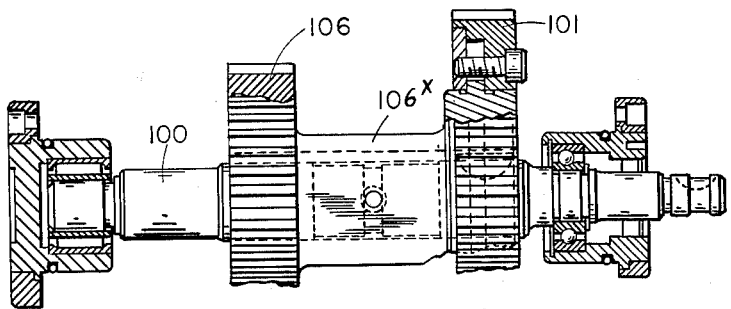
Figure 18:
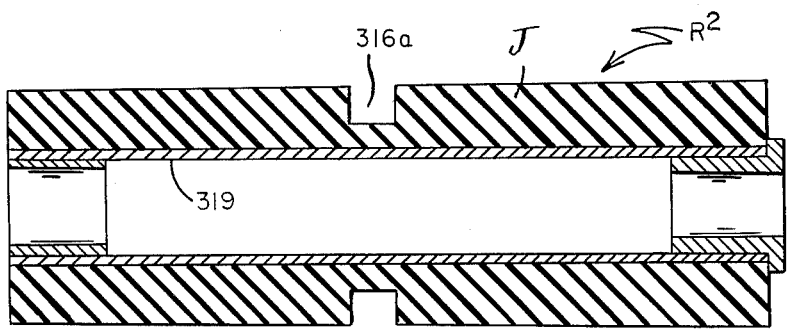
Figure 19:
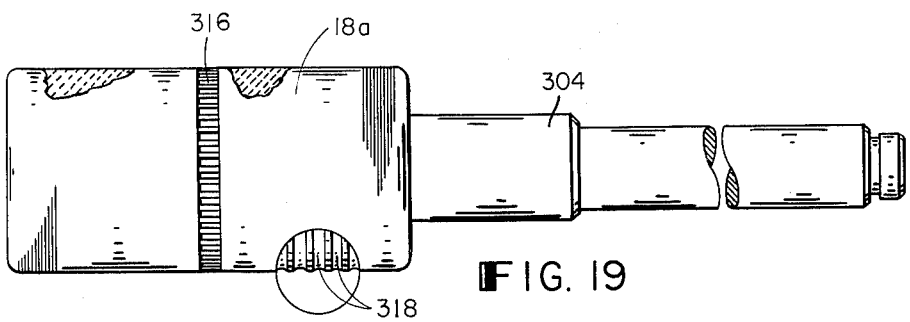

FIGS. 8 and 8a are views similar to FIGS. 6 and 6a, respectively, but showing the pickers on their way down toward label-applying position, but still located forwardly as in FIGS. 7 and 7a;

FIGS. 9 and 9a are diagrammatic illustrations showing the pickers, in edge and rear views, respectively, in various positions which they occupy during a single picking cycle;

FIG. 10 is a fragmentary perspective view showing a part of the picker-actuating mechanism as it appears when the pickers are located at label-applying position, and illustrating a safety device operative to prevent breakage of parts as the result of a displaced bottle;

FIG. 10a is a perspective view showing a switch-actuating cam forming a part of the safety mechanism;

FIG. 11 is a face view of the cam for actuating the gum-transfer roll which is mounted on the long arm;

FIG. 11a is an edge elevation, with parts in diametrical section, of the cam shown in FIG. 11;

FIG. 12 is a face view of the cam which actuates the transfer roll mounted on the short arm;

FIG. 12a is an edge elevation of the cam shown in FIG. 12, but with a portion broken away;

FIG. 12b is a view, similar to FIG. 12, but showing the cams of FIGS. 11 and 12 assembled;

FIG. 12c is a fragmentary section, to larger scale, on the line 12c—12c of FIG. 12b;

FIG. 12d is a fragmentary section, to larger scale, on the line 12d—12d of FIG. 12b;

FIG. 13 is a diametrical section through the barrel cam which moves the picker blades laterally and toward and from each other;

FIGS. 14 and 14a are elevations of the two cams which act simultaneously to rock the pickers up and down, these cams being located at opposite ends, respectively, of the barrel cam shown in FIG. 13;

FIG. 14b is a fragmentary view, showing one end of the picker control spring;

FIGS. 15, 15a and 15b are, respectively, portions of a graph indicating the relation of the motions of the two gum-transfer rolls and the picker;

FIG. 16 is an elevation, partly in diametrical section, on the line 16—16 of FIG. 4, showing the cam shaft and assembled cams for actuating the gum-transfer rolls;

FIG. 17 is an elevation, partly in diametrical section, on the line 17—17 of FIG. 4, showing the main shaft;

FIG. 18 is a longitudinal, diametrical section, to larger scale, through one of the gum-transfer rolls removed from its shaft;

FIG. 19 is a fragmentary elevation, to smaller scale than FIG. 18 (but with a portion shown magnified), illustrating the gum-supply roll with its shaft;

FIG. 20 is a fragmentary section in the vertical plane of the axis of the gum-supply roll, illustrating an attachment which comprises the gum-supply roll and its supporting and driving shaft;

FIG. 21 is a fragmentary, vertical section on the line 21—21 of FIG. 20;

FIG. 22 is a fragmentary, vertical section on the line 22—22 of FIG. 20;

FIG. 23 is a rear elevation of the gum-supply roll, the gum box and gum-elevating roll; and the scraper assembly for the supply roll;

FIG. 24 is a plan view of the gum box removed from the machine;

FIG. 25 is a partial view on the line 25—25 of FIG. 24;

FIG. 26 is a rear elevation of the gum-spreading device removed from the machine;

FIG. 27 is a fragmentary front elevation of the spreading device removed from the machine; and FIG. 28 is a fragmentary face-view of the gum-elevating roll.

In the attainment of the above objects, the apparatus of the present invention includes a gum box Z (FIG. 2) for holding liquid gum, having therein a gum-elevating roll 20 which picks up gum from the box and applies it to the peripheral surface of a constantly rotating gum-supply roll 18a (FIGS. 1, 2, 19 and 20). From the roll 18a gum is taken by two independent rotary transfer rolls $R^1$ and $R^2$ (FIGS. 1, 2 and 3), one of which receives gum from the roll 18a and applies it to the picker during one picker cycle, while the other transfer roll takes gum from the supply roll 18a and applies it to the picker during the following cycle—the means for actuating the picker and the two transfer rolls being so devised that one transfer roll may be receiving gum from the elevating roll, while the other transfer roll is applying gum to the picker, and vice versa.

While of broader utility, the label-picking and gum-applying mechanism of the present invention is here illustrated and described with particular reference to its application to a labeling machine of the rotary type.

Referring to FIG. 3, there is diagrammatically shown, in side elevation, a casing or housing C for the gears and actuating cams for the gum-transfer rolls and picker. This casing supports bearings for the several shafts involved in driving the operative parts. Thus, the gum-transfer rolls $R^1$ and $R^2$ are here shown as carried, respectively, by a long lever arm 14a and a relatively shorter lever arm 17a—these arms being fixed to rock shafts 15a and 16a respectively. The gum-supply roll is diagrammatically indicated at 18a; and the position of the label magazine is indicated by broken lines at M; and one end of the picker shaft appears at 38. The centers of certain other shafts, hereafter to be referred to, are indicated at $C^1$, $C^2$, $C^3$, $C^4$, $C^5$ and $C^6$, respectively.

Figure 1:
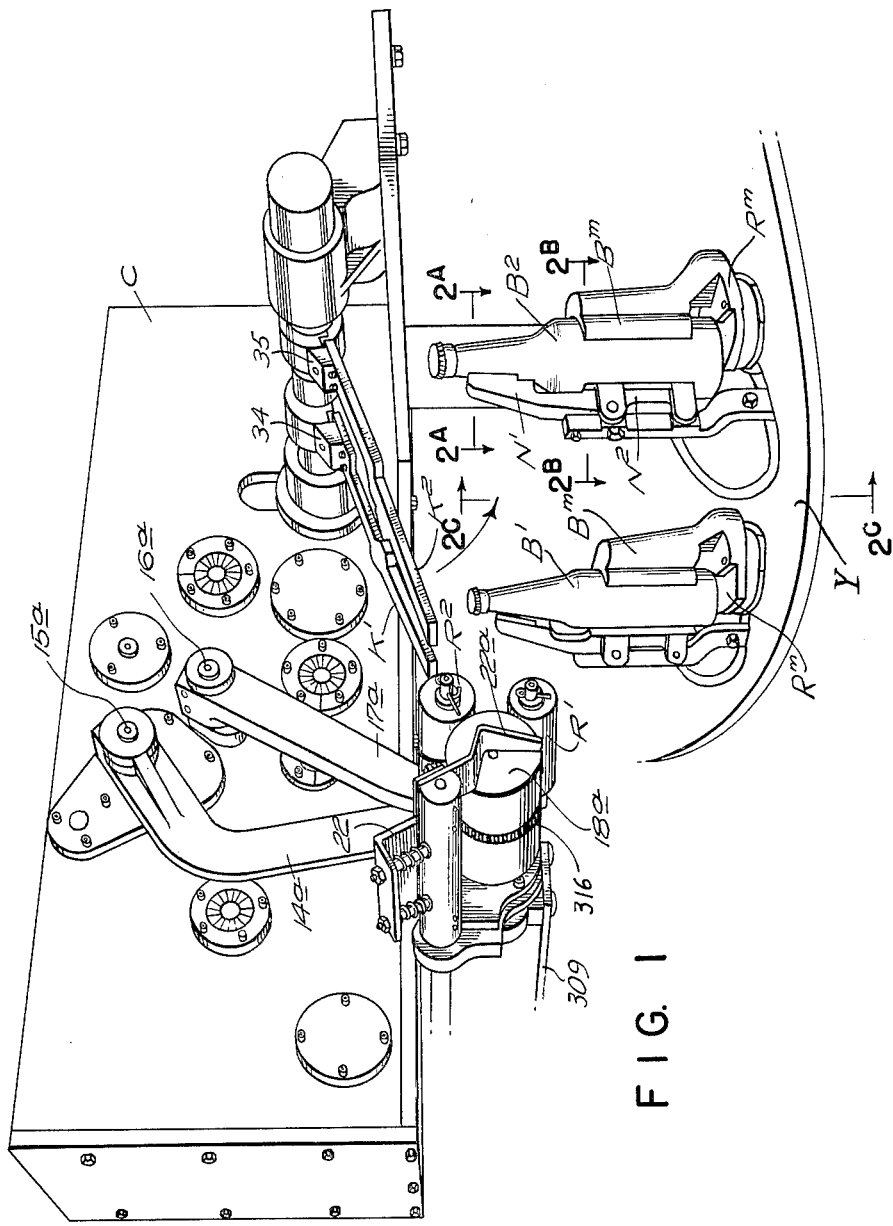

In FIG. 1 the casing or housing C is shown, merely by way of example, as associated with a labeling machine of the rotary or turret type above referred to, comprising the horizontal table Y which is turned by mechanism (not here illustrated), and upon which is mounted a series of bottle carriers $Rm$, each having a bottle-steadying bracket $Bm$ which holds the bottle in upright position and prevents it from tipping in response to the pressure of the label-pressing pad. Associated with each holder there is a grip-finger device comprising, as here shown, upper and lower parts $N^1$ and $N^2$ designed, respectively, to press the neck and body labels, delivered by the picker, against the bottle.

The picker is of the separable blade type comprising the blades $K^1$ and $K^2$ which, when separated, hold the label by its ends so that the label extends transversely of the bottle path and is thus contacted by the moving bottle.

Figure 2:
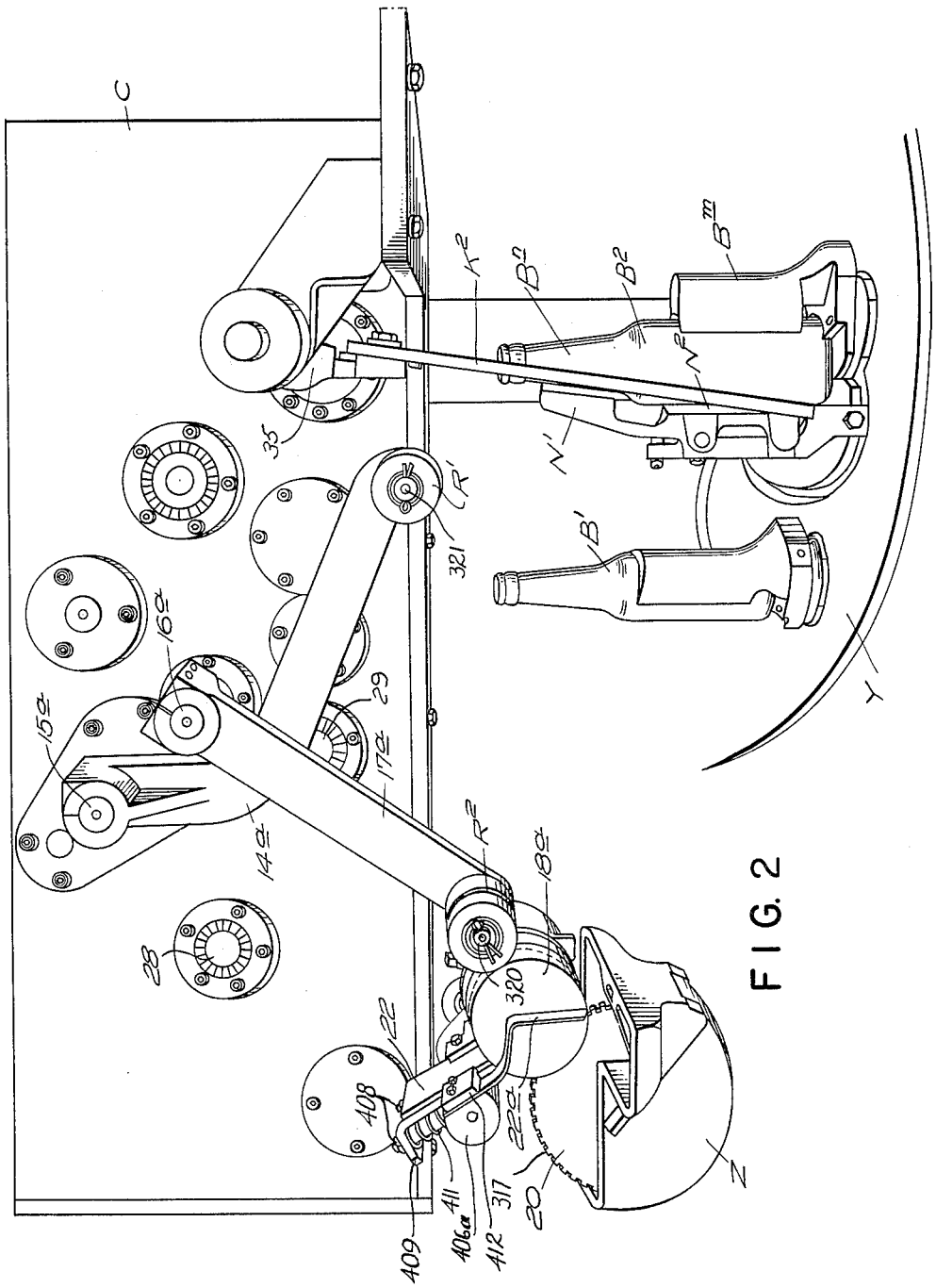
FIG. 2a is a diagram, showing the picker path in developed view, illustrative of the impracticability, in a high-speed rotary machine, of moving the picker in the conventional way in carrying a label from the magazine to the label-applying or transfer point.
FIG. 2b is a view similar to FIG. 2a, but diagrammatically illustrative of the novel path of the picker in accordance with the present invention.
FIG. 2c is a fragmentary, transverse section, to larger scale, through the picker, showing a preferred form of blade, and with a label adhering to the faces of the blades.

In order to permit high-speed in a machine in which the bottles are carried by a rotating table, as indicated in FIGS. 1 and 2, it is necessary to keep the center-to-center distance between bottles as small as possible thus reducing bottle velocity and the effects of centrifugal force. Under such conditions, where the bottles follow each other very closely in carrying a label from the magazine to the label-applying point—if the magazine were so located that the picker would move down from the magazine in the usual path in placing the label in tangent relation to the surface of a bottle at the label-applying position, the inner blade $K^1$ of the picker would contact the previously labeled bottle before the latter could clear the picker path. Thus, for example, referring to the diagram of FIG. 2a, the numeral 500 diagrammatically indicates, in plan, a rotary bottle-conveying table such as is employed in a high-speed rotary machine, showing the bottle path at 501 and indicating three successive bottles at $B^1$, $B^2$ and $B^3$—the bottle $B^1$ having received a label, the bottle $B^2$ being in position to receive a label, and bottle $B^3$ being on its way to the label-applying point. The numeral 503 designates a grip-finger device which holds the label in contact with the bottle after the label has been brought to the label-applying position by the picker. The label magazine is indicated at 502 and a picker comprising the two separable blades $K^1$ and $K^2$ is shown as just having taken a label L from the magazine and as ready to move along a rectilinear path, indicated by dotted lines, wherein several successive positions of the picker are indicated, for example, at $a$, $b$, $c$ and $d$—the latter being the position of the picker where it holds the label in readiness to be contacted by the approaching bottle.

Figure 2C:
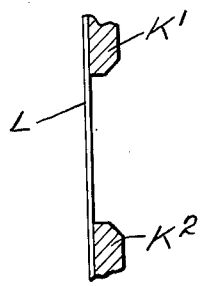
Figure 2A:
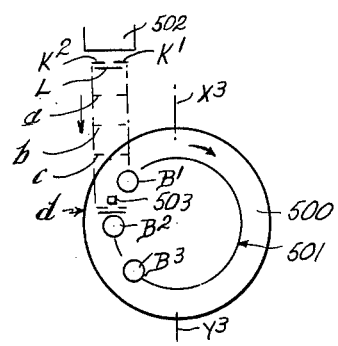

However, inspection of this diagrammatic view shows that as the picker moves from point-to-point along the path indicated, the labeled bottle B¹ will not have advanced far enough to clear the blade K¹ of the picker so that such an arrangement as that illustrated in FIG. 2a would be impractical.

It may be noted at this point that (merely for ease in illustration) the magazine 502 (FIG. 2a) is shown as so positioned that the picker may move from the magazine to the label-applying point with its blades always in a vertical plane. However, in the actual machine, the magazine would be above the table 500 and the picker would swing in an arcuate path from a position, in which its blades would be approximately horizontal to take a label from the bottom of the magazine, and would then become vertical as they move toward the label-affixing point.

To avoid the situation illustrated in FIG. 2a, the label magazine of the present invention is spaced forwardly or outwardly from the machine frame so as to allow the picker, as hereafter more fully described, and after taking the label first to move down in a path such that the inner blade of the downwardly moving picker clears the bottle which has just been labeled, but then, immediately before the bottle next-to-be labeled arrives at the label-applying position, the picker moves bodily inward so as properly to locate the label relatively to the bottle. After the label has been affixed to the bottle, the picker again moves outwardly and upwardly toward the magazine. Thus, referring now to the diagram of FIG. 2b, an arrangement is shown which is substantially like that of FIG. 2a except that the magazine has been moved from the former position (indicated in broken lines at 502a), to the position 502b, that is to say, it has been moved outwardly or further away from the center line $X^3$–$Y^3$ of the rotary table. With this arrangement the picker, still comprising the separable blades K¹ and K², first moves along a rectilinear path, moving from point-to-point, as indicated at a, b and c, but just before arriving at the label-applying position (which was indicated at d in FIG. 2a), the picker, comprising both blades K¹ and K², moves bodily, as shown by arrow A² toward the center line $X^2$–$Y^2$ of the machine table, thus dodging the bottle B¹ which has just been labeled, and also the approaching label grip-finger 503, so that the picker blades K¹ and K², carrying the label, have thus been interposed between the bottle B² and the grip-finger 503 and without interference with another part. The blades K¹ and K², as above described, separate, just an instant after the bottle touches the label sufficiently to permit passage of the bottle, so that the bottle, by contacting the center part of the label, pushes the label through the space between the inner edges of the picker blades—the midportion of the label being pressed firmly against the bottle by the grip-finger 503, while the bottle advances and the grip-finger recedes thus stripping the opposite ends of the label from the picker blades.

As the bottle passes the label-applying position, the picker moves outwardly and upwardly to its original position in readiness to take another label from the magazine.

Figure 2B:
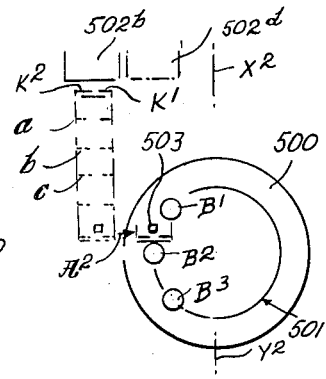

By an arrangement embodying the principle illustrated in FIG. 2b, it is practicable to space successive bottles more closely than has been possible previously in rotary-type machines, thus allowing the employment of a table of relatively small diameter which may be driven at unusually high angular velocity without developing excessive centrifugal force such as to cause the bottles to tip.

As illustrated in FIGS. 1 and 2, the gum is delivered to the gum-supply roll 18a from an open-topped reservoir or gum box Z (FIG. 2), having therein a rotating gum-elevating roll 20, here shown as a disc having peripheral teeth 317. A doctor blade or scraper 22 (FIGS. 1, 2 and 21) is urged toward the roll 18a under spring pressure and operates to spread the gum longitudinally of the roll 18a. Associated with this doctor blade 22 there are scraper blades 22a (FIGS. 1, 2 and 26) which remove gum from the ends of the roll 18a and return it to the gum box.

Referring to FIG. 4, the numeral 24 designates a shaft whose center is at $C^1$ (FIG. 3), on which is mounted a lever arm 25 whose free end is connected by a link 26 to a rock arm 27 fixed to a crankshaft 16a provided with a crankarm 17a (FIG. 2), hereafter referred to as the "short" arm, having a crankpin 320 at its free end on which turns the gum-transfer roll R². Intermediate its ends the lever 25 (FIG. 4) carries a cam follower roll 28 which engages a groove 33a (FIG. 12) in the front face of a cam W′, fixed to a shaft 29 (FIGS. 4 and 16), whose axis is at $C^5$ (FIG. 3). The edge, only, of this cam is indicated by broken lines in FIG. 4. This cam is operative to rock the short crankarm 17a which carries the gum-transfer roll R² to perform its intended operation, at each cycle of the machine. Another lever arm 30 (FIG. 4), also rocking about the axis of shaft 24, is connected by a link 31 to rock arm 32 fixed to the shaft 15a on which is mounted the crankarm 14a (FIG. 2), (hereafter referred to as the "long" arm), having the crankpin 321 (FIG. 2) at its free end on which turns the gum-transfer roll R¹. The free lever arm 30 is provided with a cam follower roll (not shown) which engages a cam groove 33b (FIG. 11), in a cam W² (FIGS. 11 and 16) also fixed to shaft 29.

As shown in FIGS. 11, 12b, and 16, the cam W² has peripheral gear teeth 105 which mesh with the teeth of a gear 104 mounted on the shaft 103 (FIG. 4), whose axis is at $C^3$ (FIG. 3). This cam W² is bolted to a split sleeve 104a (FIG. 16) which is clamped, after adjustment, to the shaft 29. The other cam W¹ (FIGS. 12, 12a and 12b) is non-circular, being slabbed-off at 600 (FIG. 12), so as to leave a radially projecting tongue 601 having a bore 602 extending parallel to the axis of the cam. This tongue also has oppositely directed, threaded holes 603, 604 extending into the bore 602 in the tongue 601. The cam W² has a bore 605 (FIG. 12c) in which there is fixed a drive pin 606 having a head 607 interposed between the inner ends of screws 608 and 609 (FIG. 12b) in the holes 603 and 604 in cam W¹. By this means cam W¹ may be angularly shifted relatively to the cam W² thereby to permit accurate adjustment of the rolls R¹ and R² relatively to the picker. A shoulder bolt 610 (FIG. 12d) has threaded engagement with a threaded hole 611 in cam W¹ and passes with clearance through a hole in cam W², thereby providing added means for clamping the cams in relatively adjusted position. The rotation of the shaft 29 with its cams W¹ and W² thus effects the proper operation of the two gum-transfer rolls R¹ and R².

Referring to FIGS. 19 and 27, the gum supply roll 18a, which is desirably, although not necessarily, of porcelain or other ceramic material and which, for example, may be of the order of 3 inches in diameter and of a length of approximately 6 inches, is substantially cylindrical and fixed to one end of a rigid shaft 304 (FIG. 20) which turns in bearings in a frame 300a comprising the spaced vertical supporting flanges 307 and 307a. These flanges have horizontal feet at their lower edges, respectively, which rest upon a supporting plate 309 on which they may slide—being normally held in fixed position by bolts 310 passing up through slots in plate 309. By means of adjusting screws 308 and 308a (FIGS. 21 and 22), the flanges 307 and 307a may be adjusted (after loosening bolts 310) in a direction perpendicular to the vertical plane of the axis of the shaft 304 thereby to adjust the roll 18a bodily in a horizontal plane.

The supporting plate 309 rests upon vertically adjustable screws 311 and 312 (FIG. 20) having threaded engagement with brackets 313 and 314, carried by a fixed part 315 of the machine frame. By this means the axis of the roll 18a may be adjusted vertically.

As shown in FIG. 19, the cylindrical roll 18a has a peripheral groove approximately midway between its opposite ends and within this groove there are arranged gear teeth 316 of suitable shape for driving engagement with the teeth 317 (FIGS. 2 and 28) formed on the edge of the gum-elevating roll 20.

Referring to FIG. 20, the shaft 304, which carries the roll 18a at one end, is provided at its opposite end with a pair of sprocket wheels, each connected to its shaft by an overrunning clutch of conventional type (not here shown). One sprocket is constantly driven by a chain (not here shown), while the other sprocket is driven through suitable connections (not shown) from the main shaft 108 (FIG. 4) which actuates the picker and transfer rolls. Thus, the rolls 20 and 18a turn continuously even through the transfer rolls and pickers are not operating. This insures a constant agitation of the gum in the gum box such as to prevent it from crusting over.

Referring to FIGS. 2 and 20 to 28 inclusive, the frame 300a (FIG. 20), which carries the bearings for the shaft 304 to which the gum-supply roll 18a is fixed, is provided at opposite ends with integral lugs 400 and 401 (FIGS. 21, 22 and 23) which have aligned openings within which there are fixed bushings (not shown)—the bushing 402 in the lug 400 being of smaller maximum diameter than the bushing 403 in the lug 401. The gum-spreading assembly 406 (FIG. 23), which includes the doctor blade 22 and scraper members 22a and 418 comprises a shaft 406a (FIG. 26) having a cylindrical portion 407 (FIG. 26) and a tapering portion 408 (FIGS. 26 and 27). A friction fit is thus provided. To prevent undesired motion of this shaft, when the device is in use, it is provided with a radially extending pin 407a (FIGS. 23, 26 and 27), which, when the scraper assembly is in operative position is disposed between laterally spaced abutment surfaces (FIG. 23) which prevent axial motion of this shaft and which contacts a part of the machine frame thus limiting rotation of the shaft. However, by manually turning the shaft until the part 407a is moved from between said abutment surfaces, the shaft 406a may be withdrawn endwise from the bushing without necessitating the removal or loosening of set screws or other customary retaining devices. The gum-spreading assembly may thus be very readily removed from the machine, for example, for cleaning or adjustment of its parts.

Two pins 407x (FIGS. 2 and 26), spaced longitudinally of the cylindrical part 407 of the shaft 406a, project radially from the latter and pass through holes in a flange 409 integral with the doctor blade 22. The outer portions of these pins 407x are screw-threaded for the reception of wing nuts 410. Compression springs 411 are interposed between the flange 409 and the peripheral surface of the part 407. By turning the wing nuts 410, the lower edge 22b (FIG. 27) of the doctor or scraper blade 22 may be adjusted relatively to the peripheral surface of the gum-supply roll 18a.

The scraper 22a (FIG. 2) which removes gum from the outer end of the roll 18a, has its upper part (FIG. 27) clamped between a plate 412 and the periphery of the shaft 406a by bolts 413. This end scraper blade 22a has an upper portion provided with an edge 414 which is closely adjacent to the upper part of the outer end face of the roll 18a, when the parts are assembled, and another edge portion 414a which is closely adjacent to the lower part of the outer end face of the roll 18a.

Adjacent to the inner end of the blade 22, a collar 415 (FIG. 26) is fixed to the shaft 406a—this collar having (FIG. 27), a portion 415a which overlies the front face of the blade 22, and an edge 416 which is closely adjacent to the upper part of the inner end face of the roll 18a. An arm 417 (FIGS. 26 and 27), extends downwardly from the collar 415 and has a scraper member 418 at its lower edge which engages the periphery of the shaft 304 on which the roll 18a is mounted—this scraper edge extending from the end face of the roll to the exposed radial surface of an annulus 419 (FIG. 21), desirably of an antifriction material such as a hard synthetic plastic, which is secured to the frame 307a by screws 420 (FIG. 21).

The gum box Z (FIGS. 2 and 24) may be of any suitable material appropriate to hold the liquid gum which is employed, although desirably of some material which is not corroded by the gum. For example, and as here illustrated, it is a unitary aluminum casting having an internal, integral support 421 (FIG. 24) provided with an elongate slot 422 for the reception of the gum-elevating roll 20. At opposite sides of this slot the support 421 is provided with open bearings 423 and 423a aligned with each other and which are designed to receive trunnion or journal elements 424 coaxial with the roll 20 and projecting from opposite sides of the latter. These trunnions provide for free rotation of the roll 20, but, at the same time, permit the roll to be lifted freely from the gum box without necessitating the manipulation of bolts, set screws, or other retaining devices. This gum-elevating roll 20 is here shown (FIGS. 2, 24 and 28) as a disc which may, for example, be of the order of one-half inch in thickness and of a diameter of five inches (such dimensions being cited merely by way of example and without limiting intent), and the edge of the disc-like roll is provided with teeth 317 (FIG. 28), as above described, for engagement with the teeth 21 of the gum-supply roll 18a. While the gum-elevating roll 20 may be of any suitable or desirable material, it has been found that a roll made from layers of textile fabric bonded together by means of a suitable synthetic plastic under high-pressure is desirable for the intended purpose, since it is not subject to corrosion by the gum and makes good running contact with the teeth 21.

For supporting the gum box in position, it is provided with two rigid rods 425 and 426 projecting from its left-hand wall 427, as viewed in FIGS. 23 and 24, the box desirably having an integral, internal boss 428 having a bore for the reception of the inner end of the rod 425, said end being permanently fixed within the bore. This rod 425 is coaxial with the trunnions 424 and provides the principal support for the gum box—rod 426 functioning primarily to prevent the box from rocking accidentally about the axis of the rod 425. The rod 425, as here shown, is of a length approximating the maximum dimension of the gum box, that is to say, the length of the wall 429 (FIG. 24) of the latter. Referring to FIG. 21 there is shown a cradle 430 which is fixed to the flange 307a of the frame 300a by means of bolts 431—this cradle having an elongate supporting surface 432, preferably, as shown, sloping downwardly at a slight angle toward its forward end and upon which the rod 425 rests when the parts are assembled. The cradle also comprises a part 433 overhanging the forward end of the surface 432, forming with the surface 432 a socket within which that portion of the rod 425 (indicated in broken lines in FIG. 21), which is adjacent to the wall 427 of the gum box, is normally disposed. The cradle 430 is provided at its outer or rear end with a cavity 434 for the reception of the rod 426 when the gum box is in operative position.

Near its outer or free end the rod 425 is provided with a retaining device 435 (here shown, FIG. 25, as the ball at the upper end of a pin 436 fixed in a diametrical opening in the shaft 425). As shown in FIGS. 20 and 22, the frame 300a is provided, at the opposite side from the cradle 430, with a bracket 437 attached to the frame by bolts 438 and having a horizontal flange 439 provided with a socket opening 440 (FIG. 20) of a size to receive the ball 435.

When the parts are assembled, that portion of the rod which is close to the wall 427 of the gum box, is within the socket beneath the part 433 of the cradle 430 and resting upon the surface 432, while the free end of the rod 425 is disposed below the flange 439 of the bracket 437, with the ball 435 in the socket 440 and with the major part of the weight of the gum box assembly to the right of the flange 307a. The gum box is thus held firmly in place and with the teeth of the gum-elevating roll 20 engaging the teeth 21 of the supply roll 18a. However, if it be desired to remove the gum box for washing, it is merely necessary to rock the rear edge of the gum box upwardly about the axis of the rod 425 and, in so doing, disengage the teeth of roll 20 from the teeth of roll 18a. The gum box may now be moved rearwardly about the bolt 435 as a pivot while the rod 425 slides along the surface 432 of the cradle until the box is free of adjacent parts and then the free end of the rod 425 may be moved downwardly to disengage the ball 435 from the socket, leaving the gum box entirely free without necessitating the preliminary loosening or removal of parts.

It will thus be appreciated that the means for supplying gum to the supply roll 18a is of such design and construction that it is very easy to clean its parts, including the scraper devices, the gum box and the gum-elevating roll, without requiring the employment of tools as a preliminary.

Each of the transfer rolls $R^1$ and $R^2$, as illustrated specifically in FIG. 18 (where only the roll $R^2$ is shown), desirably comprises a tubular core 319 having a bearing bushing in each end designed to turn upon the corresponding crankpin 320 or 321 (FIG. 2)—each fixed at one end to one of the crankarms 14a and 17a. Each transfer roll also comprises a jacket J (FIG. 18), for example of vulcanized rubber, embracing the core 319— this jacket being accurately concentric with the axis of the core 319 and providing a gum-conveying surface whereby gum is carried from the supply roll 18a to the pickers. Merely by way of illustration, the peripheral surface of the roll may be approximately 6 inches in length and the maximum outside diameter of approximately 1¾ inches.

As illustrated in FIG. 18, each transfer roll is provided, approximately midway between its ends, with a groove 316a, which is arranged to register with the groove in the gum-supply roll 18a within which the gear teeth 316 are located. The groove 316a in the roll $R^2$ may, for example, be approximately ⅜ of an inch in width and ¼ inch deep. The purpose of this groove is to keep the transfer roll from picking up gobs of glue from the teeth 316 of the roll. Although the gear teeth 316 at the center of the roll 18a have their edges flush with the outside peripheral surface of the roll, it is found that gum will tend to accumulate at the location of these gear teeth as the roll 18a passes beneath the scraper 22 and that if this accumulation of gum be allowed to touch the rubber transfer roll it will be picked up by the latter and interfere with the proper and uniform application of gum to the picker. By the provision of this groove 316a in the transfer roll, this tendency is avoided. By making the roll 18a of ceramic material, which is moldable, it becomes readily possible to arrange the teeth 316 in a peripheral groove in the roll and so that the tips of the teeth do not project beyond the surface of the roll while, at the same time, providing a roll which is not subject to corrosion.

Because the gum-transfer rolls $R^1$ and $R^2$ are mounted upon the short shafts or crankpins 320 and 321, respectively, each supported at one end, only, and at the free end of one of the long crankarms 14a or 17a, respectively, the pressure force between the transfer roll and the inner picker $K^1$, when they are in contact, has a tendency to spring the parts so that the transfer roll axis is no longer exactly parallel to the surface of the picker. In the apparatus of the present invention, as already described, there is a side motion of the picker, as the picker moves up and receives gum on its way to the magazine, which results in a tendency to push the outer end of the transfer roll away from the outer picker blade $K^2$. Since a certain degree of pressure is essential to insure transfer of gum from the transfer roll to the picker, especially at high-speed, it is essential in some way to compensate for the spring of the parts which support the transfer roll in order to insure application of a uniform coating of gum to the picker. In accordance with the present invention, in order thus to compensate for those factors which tend to prevent such uniform application of gum to the picker, the transfer rolls are tapered in diameter, with the smaller end of each transfer roll adjacent to the lever arm which supports it. A taper of approximately 1/32 of an inch in the length of the roll has been found sufficient to insure substantially uniform application of gum to the picker. However, while the use of the tapered transfer roll solves the problem of transferring a uniform coating of gum from the transfer roll to the picker, this complicates the application of a uniform coating of gum to the transfer roll by the supply roll. To meet this latter difficulty the shaft of the supply roll 18a is so supported, as above described, that it may be shifted both horizontally and vertically so that its peripheral surface may be adjusted accurately to be parallel to that of the transfer roll at the line where the rolls contact. While the transfer rolls, as here shown, are designed to be rotated merey by contact with the rotating supply roll 18a, it is contemplated that the transfer rolls may be positively driven, for example, by providing each transfer roll with a series of gear teeth or similar elements arranged to engage similar complemental elements carried by or rotating with the supply roll 18a.

The two picker blades $K^1$ and $K^2$ (FIGS. 1, 6 and 6a), respectively, are secured to parts 34 and 35 (FIGS. 5 and 6a), the part 34, which carries picker blade $K^1$ being fixed to a tubular shaft 36 (FIG. 5), one end of which is mounted to turn in a bearing 37 fixed in an opening in the wall of the housing or casing C, while the part 35, which carries the picker blade $K^2$, is fixed to a solid shaft 38, part of which telescopes within the tubular shaft 36 and whose opposite end (remote from the part 35) is arranged to turn and slide in a bearing 39 (FIG. 5) mounted in an opening in the wall of the casing.

A sleeve 40 (FIG. 5), having a peripheral groove 41 and a radial arm 45, is so fixed to the shaft 38 that axial motion of the sleeve produces corresponding axial motion of the shaft, while rotational movement of the sleeve 40, about the axis of the shaft, causes the shaft to rock. A sleeve 42 of generally corresponding type is fixed to the tubular shaft 36—this sleeve 42 having the peripheral groove 43 and the radial arm 44. The arms 44 and 45 of the two seleves have aligned holes 46 and 47 (FIG. 5) in which are secured antifriction bearings which receive an elongate rigid rod 48 (FIGS. 4, 6a, 7a, 8a and 10) to whose opposite ends are pivotally attached the lower ends of rigid links 49 (FIGS. 4, 6a, 7a, 8a and 10), whose upper ends are pivotally connected to an elongate rigid rod 48a. The rod 48a turns in spaced bearings fixed in the free ends of levers 50a and 50b (FIG. 6) which rock about the center $C^6$ (FIGS. 3) on a supporting shaft 51 (FIGS. 4, 6 and 10). A third rigid link 49a (FIG. 10) is pivotally connected at its upper and lower ends, respectively, to the rods 48a and 48. Each of the levers 50a and 50b is provided, intermediate its ends, with a stub shaft 52 on which there is mounted a cam follower roll 53 (FIGS. 6, 14 and 14a)—these cam follower rolls engaging cam grooves 300 and 301 respectively, in cams 302 and 303 (FIGS. 14 and 14a) at the opposite ends of a barrel cam 304m (FIG. 13), having peripheral grooves 305 and 306 and which is fixed to the shaft 61, said barrel cam having peripheral teeth constituting a gear 109.

By means of the above-described mechanism, the picker blades $K^1$ and $K^2$ are rocked in properly timed relation to the other parts of the machine. Desirably, the rod 48 (FIG. 6a) is provided at each end, respectively, with restraining means, for example a shoe 307m (FIG. 10) which slides in contact with a flat vertical surface (not here illustrated) of the machine frame thereby to prevent rod 48 from moving endwise, although permitting it to move freely up and down.

Each of the lever arms 50a and 50b has an upstanding lug 50x (FIGS. 6 and 10) near its pivoted end. A rigid rod 50m, connecting these lugs, provides anchorage for one end of a long tension spring 50t (FIGS. 4 and 10), whose other end (FIG. 4) is anchored to the wall of the housing C. One desirable means for attaching the end of such a spring to another part, for example the rod 50m, is by providing an anchored member for the end of the spring such, for example, as that part 1000 (FIG. 14b), having a shank 1001 provided with a screw thread of a special configuration adapted to make screw-threaded engagement with the spires of the spring, thus providing a secure connection without creating force causing transverse deflection of the spring.

The spring 50t, as thus arranged, tends to hold the levers 50a and 50b upwardly and thus to swing the picker blades downwardly toward the label-applying position.

A fixed support E (FIG. 6), forming a part of the casing C, carries parallel stub shafts 54 and 55 (FIG. 6a) on which are mounted lever arms 56 and 57, respectively, each of these lever arms having a forked lower end 58 (shown in dotted lines in FIG. 6), which is received in one of the grooves 41 or 43, respectively, in the sleeves 40 and 42 (FIG. 5) above described. Each of these lever arms 56 and 57 is provided with a cam follower roll 59 (such as is indicated in FIG. 6), for engagement with one of the grooves 305, 306 (FIG. 13), respectively, in the periphery of the barrel cam 304m, which is mounted on the shaft 61, whose center is at the point $C^4$ (FIG. 3). As this barrel cam rotates the lever arms 56 and 57 are so moved as to cause the sleeves 40 and 42 to move relatively to each other in a direction parallel to the axis of the shaft 38.

At this point, it is to be noted that the label magazine is located, as suggested in the diagrammatic view (FIG. 2b) at such a distance outwardly from the front wall of casing C, that the picker, after taking a label, may move downwardly near the label-affixing position without contacting a labeled article on the rotary table Y.

The cam grooves 305 and 306 in the barrel cam 304m (FIG. 13) are so contoured that when the picker is taking a label from the magazine, the proximate edges of picker blades $K^1$ and $K^2$ are at their nearest point of approach, then being in the relative position designated at I and Ia in FIGS. 9 and 9a. As the picker moves down from the magazine carrying a label, the contour of the grooves 305 and 306 in the barrel cam is such that the blades $K^1$ and $K^2$ remain in the same relative position, as shown at I and Ia (FIGS. 9 and 9a), until the picker has moved, for example, approximately one-half way down toward the label-applying point—the relative positions of the parts then being diagrammatically shown at II and IIa (FIGS. 9 and 9a). When the picker is but a short distance from the label-applying point, both blades are shifted inwardly, that is, toward the casing C. Thus, as indicated at IIIa (FIG. 9a), the blades $K^1$ and $K^2$, although remaining at the same distance apart, have both moved bodily to the right (as viewed in FIG. 9a) by the amount suggested by the space between the arrows Am and An, so that now the picker blades are disposed at equal distances, respectively, from the center line Q, indicating the vertical plane of the axis of the bottle to be labeled, as it stands in the label-receiving position.

As the picker reaches the label-applying point, the blades $K^1$ and $K^2$ are caused, by the grooves of the barrel cam, to move further apart as shown at IVa (FIG. 9a), so as to permit the bottle to pass between them and the blades remaining in this relative position as the picker starts to move upwardly toward the magazine. At convenient times in its upward travel, the actuating cams shift both blades laterally in the same direction and then cause them to approach so that the picker may again enter the label magazine in readiness to take another label.

The amount of bodily movement of the picker in shifting laterally from label-picking position to label-affixing position would necessarily vary according to the size of the article to which the label is to be applied. For instance, for pint bottles this lateral motion may be of the order of 1½ inches, while for quart bottles the lateral motion may be 2 inches. To accomplish this result, interchangeable cams of the proper contours would be supplied.

The numeral 100 (FIG. 4) designates the main drive shaft of the gum-applying apparatus, this shaft being journaled in suitable bearings carried by the opposite walls of the casing. As here shown (FIG. 17), the shaft 100 carries a gear 106, integral with a sleeve 106x keyed to the shaft 100. A gear 101 is so clamped to a peripheral flange 101x on said sleeve, that it may be adjusted angularly relatively to the sleeve and shaft. The gear 106 meshes with the gear 104 on the shaft 103, the latter turning in bearings carried by the side wall of the casing C. The gear 104 meshes with the teeth 105 on the cam $W^2$, as above described, which is fixed to the shaft 29. The gear 101 meshes with a gear 107 mounted on a shaft 108 having bearings in the opposite walls of the casing C—the gear 107 also meshing with a gear 109 on the barrel cam 304m which moves the picker blades laterally.

An appropriate ratio for driving the transfer rolls and picker in properly timed relation is, by way of example, as follows:

| Gear: | Teeth |
|---|---|
| 105 (cam $W^2$) | 112 |
| 104 | 32 |
| 106 | 40 |
| 101 | 55 |
| 107 | 14 |
| 109 | 77 |

The provision for angular adjustment of gear 101 relatively to shaft 100, as above described, makes possible the relative adjustment of the cams $W^1$ and $W^2$ which actuate the transfer rolls and the barrel cam 304m which actuates the picker, thereby to insure accuracy of timing of the picker and the gum-transfer rolls.

Because shaft 61 makes two revolutions for each single revolution of shaft 29, the picker performs two cycles for each one revolution of the cams which actuate the transfer rolls. This is suggested in FIGS. 15a and 15b, where the upper and lower rows of numerals below the graphs indicate the relative angular positions of the picker cams and the cams for actuating the transfer rolls, respectively.

In order to avoid the possibility of injury to the parts of the machine, if, for example, a bottle should tip in passing from the usual feeder star wheel (not here shown) to the bottle carrier Rm and thus interfere with the normal downward motion of the picker, the groove of each of the picker-actuating cams 302 and 303 (FIGS. 14 and 14a) is provided with an abnormally wide portion between the points $X^2$ and $Y^2$, thus permitting the cam follower roll which, by the action of spring 50t, normally follows the outer wall of the cam groove (when moving along this clearance portion of the groove), to move radially inward in response to unusual force, so that the picker will not be destructively forced downwardly in attempting to reach the normal label-transfer position.

As a further measure of safety, one of the levers (for example, the lever 50b, FIG. 10), by means of which the pickers are rocked, is provided with a resilient metal contact finger $F^1$ which is normally in operative relation to a proximity switch Sw, while the cam follower roll is normally moving between the points $X^2$ and $Y^2$ in contact with the outer contour of the cam, this switch Sw being in parallel with a second proximity switch Sm (FIG. 10a) in the drive circuit of the machine. So long as the pickers are free to move downwardly to their normal extent, the circuit will be closed at the switch Sw during the arc $X^2$ and $Y^2$ of rotation of the cams 302 and 303.

Referring to FIG. 10a, there is shown a disc Ha which is mounted on a shaft Hm turning in time with the main shaft of the machine, in such a way that each time the contact finger $F^1$ (FIG. 10) rises into operative relation to the switch Sw, a slot or recess Hb in the disc Ha registers with the second proximity switch Sm, above referred to, so as to open the latter switch. However, since the switch Sm is thus open only once in each revolution of the shaft Hm, during that part of the cycle corresponding to the arc $X^2$ and $Y^2$, just referred to, the stop circuit of the machine is not broken unless, at the same time, the switch Sw is open by failure of the contact finger $F^1$ to rise, since the two switches are in parallel. Normally, assuming that the picker is free to move downwardly to its lowest extent during each cycle, the concomitant rise of the contact finger $F^1$ into circuit-closing relation to the switch Sw will keep the circuit from being opened and the machine will continue to run. However, it will be understood that if there is any interference in the downward motion of the pickers due to a misplaced bottle, so that the levers 50a and 50b cannot travel to their full height and in consequence the circuit is opened at the switch Sw, the machine will be automatically stopped when the recess Hb in the disc registers with switch Sm thus avoiding damage.

It is important that the instrumentalities to which gum is applied and, in particular, the transfer rolls, do not become crusted with hardened gum when the machine is stopped. A stoppage as short as five minutes is sufficient to cause difficulty if one of the transfer rolls is in contact with the gum-supplying roll during this period of inactivity. To minimize such occurrence the cams $W^1$ and $W^2$ which actuate the transfer rolls are so contoured that, when a transfer roll has received its coating of gum from the supply roll, it immediately moves away from the supply roll, the arrangement being such that when one transfer roll, in approaching the supply roll 18a, comes within ⅛ inch of the latter, the other transfer roll has just moved to a distance of ⅛ inch away from the roll 18a. Thus, for two short periods of time during each revolution of the picker cam shaft, both rolls are out-of-contact with the transfer roll. Thus, it is possible, by the exercise of care in stopping the machine, to leave both transfer rolls out-of-contact with the gum-supply roll 18a, so that in starting the machine again no difficulty is occasioned by the adherence of a transfer roll to the gum-supply roll.

The diagram of FIGS. 15, 15a and 15b graphically indicate the sequence of events during two successive revolutions of the cam which rocks the picker. In this graph, and referring to the lower row of numerals at the bottom of the figures, the line $H^2$ indicates the angular positions of the arm which carries the transfer roll $R^2$ during two successive cycles of the picker; the line $H^1$ shows corresponding angular positions of the arm which carries the transfer roll $R^1$; and the line $H^3$ shows corresponding angular positions of the picker. The line Kx indicates the side or lateral motion of picker blade $K^2$, while line Ky indicates the side or lateral motion of picker blade $K^1$ at 10° intervals during said successive rotations of the picker cam.

Starting with transfer roll $R^1$ and following line $H^1$ (FIG. 15), this roll is dwelling in contact with the supply roll 18a at zero degrees, but breaks contact with the supply roll at 117.5° and, in continuing to 121°, moves ⅛ inch away from the supply roll.

Turning now to transfer roll $R^2$ and following line $H^2$, this roll, which has received glue from the supply roll, begins to apply glue to the picker at 52° and continues so to do until 104° where it leaves the picker and is then on its way back to obtain a new supply of glue. At 121° it has arrived at a point where it is ⅛ inch away from the supply roll. Thus, for a short period at about 121°, in the rotation of the transfer roll cams, both transfer rolls are out-of-contact with the supply roll.

The roll $R^2$, now continuing on beyond 121° (FIG. 15) and arriving at 124.5°, contacts the rotating supply roll 18a and dwells (FIG. 15a) in contact with the latter from 133° (FIG. 15a) to 295° (FIG. 15b), thus obtaining a fresh supply of gum. In the meantime roll $R^1$ (following line $H^1$), at 232° (FIG. 15a), contacts the upwardly moving picker and remains in contact therewith, applying gum to the picker blades until 271° (FIG. 15b) where it leaves the picker and moving toward the supply roll 18a arrives at a point ⅛ inch from the latter at 301°. Turning again to roll $R^2$ and following line $H^2$, this roll leaves the supply roll 18a at 295° and at 301° is spaced ⅛ inch from the supply roll so that for a short period at about 301°, both rolls $R^1$ and $R^2$ are again spaced from the supply roll 18a. The roll $R^2$ then continues on its way (following line $H^2$) reaching its starting point at 52° (FIG. 15), during the next cycle where it again starts to apply gum to the picker.

The roll $R^1$, after leaving 301° (following line $H^1$), contacts the supply roll 18a at 304.5° and dwells in contact with the supply roll to the completion of this cycle of the transfer roll cams and then continues on into the next cycle back to the aforesaid starting point at 117.5° (FIG. 15).

The above sequence of motion of the transfer rolls occupies two full rotations of the picker cam during which the picker completes two cycles, in each of which it takes a label from the magazine and applies it to a bottle—receiving gum from the transfer rolls $R^1$ and $R^2$ alternately during successive cycles. It will be observed that each transfer roll starts to gum the picker at 50° and at 232°, but the roll $R^1$ leaves the picker at 200° while the roll $R^2$ leaves the picker at 182°.

The graph of FIGS. 15, 15a and 15b shows that transfer roll $R^1$ contacts the supply roll through 170.5°, while roll $R^2$ contacts the supply roll through 173.0° of each cycle of rotation of the shaft on which the transfer roll cams are mounted; thus each roll receives gum during slightly over 170° of each rotation of the shaft. Moreover, as above noted, during each picker cycle there is a short interval of time, when one transfer roll is receding from the supply roll and the other is approaching the supply roll, during which both rolls are spaced a short distance from the supply roll, so that if the machine be stopped during this period, neither transfer roll can adhere to the supply roll.

Again, referring to FIGS. 15, 15a and 15b, let it be assumed that at zero degrees of the first revolution of the picker cam (FIG. 15)—(see the upper row of numerals at the bottom of the figures), the blades $K^1$ and $K^2$ of the picker are substantially vertical (actually 6° from the vertical), and spaced apart so that the bottle $B^2$ (FIG. 9, IV) has been able to pass between them and contact the gummed label carried by the picker blades. At approximately 23° of the first revolution of the picker cam, the picker begins to swing upwardly and having received gum from the transfer roll $R^2$ and having moved forwardly into registry with the magazine and having taken a label, starts down at approximately 245° of the first revolution of the picker cam (FIG. 9). The picker, carrying a label, first moves in a path, such as above described (FIG. 2b), so as to avoid the bottle $B^1$ which has just received a label but then moves rearwardly at about 20° of the second picker cycle to register with the bottle which is about to be labeled. At about 60° of the second revolution of the picker cam (FIG. 15a), the picker blades separate (FIG. 9), to permit the bottle $B^2$ to pass between them and take the label. The parts are now disposed in the same relative positions as at the beginning of the first revolution of the picker cam.

Preferably the inner edges of the picker blades are beveled, as shown in FIG. 2c, thus permitting the use of adequately thick blades without lengthening the time necessary for the safe passage of the bottle between them.

As above suggested, while the picker and the means for applying gum thereto has herein been illustrated and described with particular reference to their use in a machine of the rotary type, it is obvious that essentially the same mechanism may be employed in a machine wherein the articles to be labeled move along a path other than circular, for example a rectilinear path. However, if installed in a machine of the latter type, the mechanism may be simplified by omitting the means whereby the picker is bodily moved in the direction of the axis about which it rocks and the magazine could be located at the usual or customary position in a machine of this straight-away type. However, the same advantages above described, with respect to the speeding-up of the machine, would be obtainable because of the possibility of operating the picker at greater speed than as usual.

While one desirable embodiment of the invention has herein been disclosed by way of example, it is to be understood that the invention is broadly inclusive of any and all modifications falling within the terms of the appended claims.

I claim:

1. In combination in a labeling machine of the kind in which a label is taken from a stationary magazine by a gum-coated picker and carried by the picker to an affixing position, and wherein gum for coating the picker, contained in a supply reservoir, is caused to coat a rotatable supply roll, means operative, during one cycle of the machine, to transfer gum from the gum-supply roll to the picker, and other means operative, during the next following cycle, to transfer gum from the gum-supply roll to the picker.

2. In combination in a labeling machine of the kind in which labels are taken from a magazine by a gum-coated picker and carried by the picker to an affixing position, and wherein gum for coating the picker is delivered to a rotatable supply roll, two gum-transfer rolls, and means operative to cause the respective transfer rolls, during alternate cycles of the machine, respectively, to receive gum from the supply roll and apply it to the picker.

3. In combination, in a labeling machine, according to claim 2, two rotary shafts, one of which carries cam means for actuating the gum-transfer rolls and the other of which carries cam means for actuating the picker, and power-driven means operative to turn the picker-actuating shaft two revolutions for each single revolution of the shaft which actuates the transfer rolls.

4. In combination in a labeling machine of the kind in which labels are taken from a stationary magazine by a gum-coated picker and wherein gum for coating the picker is lifted from a supply by a constantly rotating roll, two gum-transfer devices, means operative so as to actuate each respective gum-transfer device as to receive gum from the supply roll and to deliver it to the picker, said operating means being so constructed and arranged that while one transfer device is in position to receive gum, the other may be delivering gum to the picker and vice versa.

5. In combination in a labeling machine of the kind in which labels are taken from a magazine by a gum-coated picker and carried by the picker to a label-affixing position, and wherein the picker is moved from the magazine to the affixing position and back to the magazine once during each cycle of operation of the machine, and wherein gum for coating the picker is supplied to the surface of a rotatable supply roll, means for transferring gum from the supply roll to the picker comprising two parallel rock shafts, a rigid arm attached to each rock shaft, a gum-transfer element carried by each of said arms, respectively, means for rocking each arm in opposite directions, respectively, once during each cycle of the machine, the axes of the rock shafts and the lengths of the rigid arms being such that at one limit of the arc of motion one respective gum-transfer element is in position to receive gum from the roll and, at the other limit of the arc of motion, it is positioned to apply gum to the picker, the means for actuating the rock shafts being constructed and arranged so relatively to rock them that while one gum-transfer element is positioned to receive gum from the roll the other transfer element may be delivering gum to the picker.

6. The combination according to claim 5, wherein the means for actuating the rock shafts is such that at no time do both transfer elements contact said supply roll, the axes of the rock shafts being so positioned and the effective lengths of the respective arms being such that, when the gum-transfer element carried by one arm is nearing the supply roll, the other gum-transfer element is just leaving the supply roll.

7. A labeling machine of the kind wherein the same gum-coated picker removes a label from a magazine during each successive cycle of operation of the machine, and which comprises a gum-supply, in combination, a plurality of gum-transfer devices, each operative to receive gum from the supply and apply it to the picker, and means so actuating said transfer devices that, during one cycle, one of said transfer devices applies gum to the picker and, during the following cycle, another of said devices applies gum to the same picker.

8. In combination in a labeling machine of the kind wherein a gum-coated picker is moved back and forth once during each cycle of operation of the machine from a magazine to a label-affixing position and then back from the transfer point to the magazine and while on its way back to the magazine is supplied with a fresh coating of gum, a pair of parallel rock shafts, a rigid crankarm fixed to each rock shaft, one of said crankarms being longer than the other, a crankpin carried by each respective arm, a rotatable gum-transfer roll mounted on each, respectively, of the crankpins, the lengths of the arms being such that one gum-transfer roll may pass the other without interference, a rotatable gum-supply roll whose axis is parallel to those of the rock shafts, the picker rocking about an axis parallel to the axes of the rock shafts, and the parts being so designed and arranged that each transfer roll may receive gum from the supply roll and deliver it to the picker, and means for so moving the rock shafts relatively to each other that while one gum-transfer roll is in position to receive the gum, the other may be in position to deliver gum to the picker.

9. Apparatus of the class described wherein transfer rolls carry gum from a supply roll to a picker which rocks between a label magazine and a label-affixing point, and wherein a rotary cam rocks the picker, a shaft on which cams are mounted for actuating the transfer rolls, means whereby one of the transfer rolls dwells in contact with the gum-supply roll while another transfer roll is applying gum to the picker, and means whereby each such transfer roll, in alternation, is caused to dwell in contact with the gum-supply roll while the shaft, on which the transfer roll actuating cams are mounted, turns through an angle of approximately 162°.

10. Apparatus of the class described wherein two gum-transfer rolls carry gum from a supply roll to a picker which moves between a label magazine and a label-affixing point, a rotary cam for so moving the picker, a rotary shaft having thereon cam means operative to cause the two transfer rolls, alternately, to take gum from the supply roll and deliver it to the picker, said cam means being so constructed and arranged that each transfer roll is positioned to receive gum from the supply roll while the shaft, on which the transfer roll actuating cams are mounted, turns through an angle of approximately 162°.

11. Apparatus according to claim 2 and which comprises a constantly rotating cam for actuating the picker, further characterized in that at one period, during each complete rotation of the picker-actuating cam, both gum-transfer rolls are spaced approximately one-eighth inch from the supply roll as one is approaching and the other is leaving the supply roll.

12. Gum-applying means comprising a rocking picker, a gum-supply roll, a pair of rock shafts, a rigid rock arm fixed to each respective rock shaft, each arm rocking about an axis parallel to the axis about which the picker rocks and a gum-transfer roll carried by each rock arm, the arms being of such relative effective lengths and the locations of the axes about which said arms rock being such that each transfer roll may, at times, contact the gum-supply roll and the respective transfer rolls, at different times, contact the gum-supply roll at points on its surface spaced approximately 60° apart, while at another point in their travel the respective gum-transfer rolls contact the picker.

13. Gum-applying means comprising a rotary gum-supply roll, a picker which rocks about an axis spaced from but parallel to the roll axis, a pair of gum-transfer rolls, a pair of spaced rock shafts each parallel to the axis about which the picker rocks, a rigid crankarm fixed to each respective rock shaft, a crankpin fixed to each crankarm, and a rotatable gum-transfer roll on each respective crankpin, means for rocking the picker and the respective crankarms, the relative lengths of the crankarms and the spacing of their axes being such that, in one position of each respective arm, the transfer roll carried thereby contacts the gum-supply roll and, in another position of each respective arm, the gum-transfer roll carried by that arm makes contact with the picker at approximately the same area of the latter.

14. Gum-applying means according to claim 12, wherein the picker is of the kind which comprises two coplanar blades, cam means operative to actuate the respective rock shafts, cam means for rocking the picker, and cam means operative to move the picker blades toward and from each other, the several cams being so designed and relatively arranged that, during one complete cycle of motion of the picker, one transfer roll, having taken gum from the gum-supply roll, applies it to the picker and, during the next following cycle of motion of the picker, the other transfer roll, having taken gum from the gum supply roll, applies it to the picker.

15. Gum-applying means according to claim 14, further characterized in that the cam means for actuating the rock shafts and the cam means for actuating the picker are of such design and so timed that each respective transfer roll, in turn, dwells in contact with the gum-supply roll, while the picker-rocking cam turns through an angle of approximately 162°.

16. Gum-applying means according to claim 12, wherein each transfer roll is tapered in diameter, the smaller end of each roll being adjacent to the rock arm which carries said roll.

17. In combination in a labeling machine of the kind in which labels are taken from a stationary magazine by a gum-coated picker and carried by the picker to a label-affixing position, and wherein gum for coating the picker is delivered to a constantly rotating supply roll, two gum-transfer devices, and rotary cam means operative so to actuate the two gum-transfer devices, as to cause the respective transfer devices, during alternate cycles of the picker, respectively to receive gum from the supply roll and apply it to the picker, rotary cam means for actuating the picker, and drive mechanism for actuating the respective cam means so devised as to cause the picker-actuating cam means to make two revolutions for each single revolution of the cam means which actuates the gum-transfer devices.

18. A labeling machine of the kind wherein gum from a supply roll is applied to a label picker during each cycle of the latter, in combination, a pair of transfer rolls for taking gum from the supply roll and applying it to the picker, a power-driven cam shaft and means mounted thereon operative so to actuate the two transfer rolls that they alternately take gum from the supply roll, the cam means being so constructed and arranged that during approximately 20° of the rotation of said cam shaft, during each successive picker cycle, both transfer rolls are spaced from the supply roll.

19. A labeling machine according to claim 18, comprising means operative to drive the supply roll uninterruptedly, even though the cam shaft ceases to turn.

20. In combination, in a labeling machine of the kind in which labels are taken from a magazine by a gum-coated picker and carried by the picker to a label-affixing position, and wherein gum for coating the picker is delivered to a constantly rotating supply roll, two gum transfer rolls, and rotary cam means which actuates the two transfer rolls alternately to take gum from the supply roll and apply it to the picker, rotary cam means for actuating the picker, and drive mechanism for actuating the respective cam means so as to cause the picker-actuating cam means to make two revolutions for each single revolution of the cam means which actuates the gum-transfer rolls, said drive mechanism comprising relatively adjustable parts whereby the motion of the picker, relatively to that of the transfer rolls, may be accurately timed.

21. In combination in a labeling machine of the kind in which labels are removed from a magazine by a gum-coated picker and which includes a plurality of gum-transfer devices which, in succession, take gum from a supply roll and apply it to the same picker, means for actuating the picker cycle-after-cycle to receive gum from a transfer device; remove a label from the magazine; and deliver the label at a transfer point, and means for so actuating the several transfer devices that at no time is more than one of said transfer devices in contact with the supply roll.

22. A labeling machine of the kind wherein a label is taken from a stationary magazine by a movable gum-coated picker during each label-applying cycle and carried by the picker to a label-affixing position, and wherein the entire gum-receiving surface of the picker is in the same plane, characterized in having two relatively movable gum-transfer rolls, each operative independently to apply a coating of gum to the said picker, and means for actuating said transfer rolls in alternation whereby one delivers gum to said picker preparatory to one label-picking operation and the other applies gum to the same picker preparatory to the next successive label-picking operation.

23. A labeling machine according to claim 22, having a gum-supply element from which each gum-transfer roll receives gum, and wherein the picker is of the separable-blade type, the means for so actuating the respective gum-transfer rolls being such that while one is positioned to receive gum from the supply element the other is applying gum to the picker.

24. A labeling machine according to claim 23, and wherein the picker oscillates in an arcuate path, further characterized in that the means for actuating the respective gum-transfer rolls comprises a pair of rock shafts turning about axes parallel to that of the axis of oscillation of the picker, a rigid arm fixed to each respective rock shaft, each arm supporting a pivot element upon which one, respectively, of said transfer rolls is mounted to turn, and means for rocking said shafts in opposite directions, the relative locations of the rock shafts and the lengths of the respective arms being such that at one limit of the arc of motion of each respective rock shaft the gum-transfer roll, actuated by said shaft, is in position to receive gum and at the other limit of the arc of motion of said shaft said roll is positioned to apply gum to the picker.

25. A labeling machine according to claim 24, further characterized in having two rotary shafts, one of which carries cam means for actuating the gum-transfer rolls and the other of which carries cam means for actuating the picker, further characterized in having power-driven means operative to turn the picker-actuating shaft two revolutions for each single revolution of the shaft which actuates the transfer rolls.

References Cited by the Examiner

UNITED STATES PATENTS

| | | | |
|---|---|---|---|
| 1,056,141 | 3/1913 | Woodland | 118—261 |
| 1,175,257 | 3/1916 | Hallen | 118—263 |
| 1,252,934 | 1/1918 | Norquest | 118—263 |
| 1,308,280 | 7/1919 | Ermold | 156—484 |
| 1,338,793 | 5/1920 | Schou | 156—484 |
| 1,412,350 | 4/1922 | Jones | 118—258 |
| 1,674,638 | 6/1928 | Cook | 118—258 |
| 1,856,853 | 5/1932 | Potdevin | 118—261 |
| 1,869,065 | 7/1932 | Kyler | 156—352 |
| 2,014,710 | 9/1935 | Wild | 156—352 |
| 2,251,884 | 8/1941 | Hartmann | 156—352 |
| 2,267,549 | 12/1941 | Bronander | 156—484 |
| 2,638,073 | 5/1953 | Carter | 118—263 |
| 2,733,683 | 2/1956 | Holm | 118—263 X |

CHARLES A. WILLMUTH, *Primary Examiner.*

LEON G. MACHLIN, *Assistant Examiner.*